United States Patent
Cragun et al.

(10) Patent No.: US 7,620,648 B2
(45) Date of Patent: Nov. 17, 2009

(54) UNIVERSAL ANNOTATION CONFIGURATION AND DEPLOYMENT

(75) Inventors: Brian J. Cragun, Rochester, MN (US); David L. Darrington, Rochester, MN (US); Lonnie A. McCullough, Boston, MA (US)

(73) Assignee: International Business Machines Corporation, Armonk, NY (US)

( * ) Notice: Subject to any disclaimer, the term of this patent is extended or adjusted under 35 U.S.C. 154(b) by 1246 days.

(21) Appl. No.: 10/600,317

(22) Filed: Jun. 20, 2003

(65) Prior Publication Data

US 2004/0260702 A1 Dec. 23, 2004

(51) Int. Cl.
G06F 7/00 (2006.01)
G06F 17/00 (2006.01)

(52) U.S. Cl. .............................. 707/102; 707/9; 715/230

(58) Field of Classification Search ............... 707/1–10, 707/102; 715/512, 731
See application file for complete search history.

(56) References Cited

U.S. PATENT DOCUMENTS

| | | | |
|---|---|---|---|
| 5,404,295 A | 4/1995 | Katz et al. | |
| 5,548,739 A * | 8/1996 | Yung | 711/204 |
| 5,950,214 A | 9/1999 | Ahn et al. | |
| 6,085,185 A | 7/2000 | Matsuzawa et al. | |
| 6,389,434 B1 | 5/2002 | Ahn et al. | |
| 6,484,156 B1 * | 11/2002 | Gupta et al. | 707/1 |
| 6,490,583 B2 * | 12/2002 | Tada et al. | 707/9 |
| 6,519,603 B1 * | 2/2003 | Bays et al. | 707/102 |
| 2002/0002589 A1 * | 1/2002 | Yonenaga et al. | 709/206 |
| 2002/0059342 A1 | 5/2002 | Gupta et al. | |
| 2002/0099552 A1 * | 7/2002 | Rubin et al. | 704/270 |
| 2002/0116420 A1 * | 8/2002 | Allam et al. | 707/526 |
| 2002/0178185 A1 * | 11/2002 | Kuchinsky et al. | 707/512 |
| 2003/0135565 A1 * | 7/2003 | Estrada | 709/206 |
| 2004/0205545 A1 * | 10/2004 | Bargeron et al. | 715/512 |
| 2006/0129596 A1 * | 6/2006 | Bays et al. | 707/102 |

FOREIGN PATENT DOCUMENTS

| | | |
|---|---|---|
| EP | 1 039 398 A | 9/2000 |
| WO | WO 99/39286 A | 8/1999 |
| WO | WO 00/56055 A | 9/2000 |

OTHER PUBLICATIONS

Dettinger et al., IBM U.S. Appl. No. 10/083,075 (ROC920020044US1) filed Feb. 26, 2002, "Improved Application Portability and Extensibility Through Database Schema and Query Abstraction".
Dettinger et al., IBM U.S. Appl. No. 10/310,192 (ROC920020165US1), filed Dec. 4, 2002, "Annotation Validity Using Partial Checksums".

* cited by examiner

*Primary Examiner*—Hosain T Alam
*Assistant Examiner*—Shew-Fen Lin
(74) *Attorney, Agent, or Firm*—Patterson & Sheridan, LLP

(57) ABSTRACT

Methods, systems, and articles of manufacture for managing annotations made for a variety of different type data objects manipulated (e.g., created, edited, and viewed) by a variety of different type applications are provided. Some embodiments allow users collaborating on a project to create, view, and edit annotations from within the applications used to manipulate the annotated data objects, which may facilitate and encourage the capturing and sharing of tacit knowledge through annotations. Further, annotations may be stored separate from the application data they describe, decoupling the tacit knowledge captured in the annotations from the applications used to manipulate the annotated data.

8 Claims, 28 Drawing Sheets

| API FUNCTION | DESCRIPTION |
| --- | --- |
| QueryRoles | Get a list or roles for the user. |
| SetRole | Set the active set of roles for the session. |
| Query Structure Names | Given the data source type and subtype of the target documents and all of the points in those documents the use wants to annotate, return the list of available structures. |
| QueryStructureTransforms | Given an annotation type returned from QueryStructureNames API, return an array of URLs to XSL transforms. |
| QueryPoints | Given a GUID, and list of DataSourceVersions, return a list of data sources and the points in the data sources. |
| QueryAnnotationIDS | Given a list of search criteria, return an array of an annotation GUIDs that match the criteria. |
| GetAnnotation | Return the annotation data for a given GUID |
| CreateAnnotation | Create a new annotation with provided data and access control information |
| UpdateAnnotation | Replace specific fields in an annotation which results in a new version of the annotation |
| DeleteAnnotation | Delete (or hide) the specified annotation |
| AddPoint | Take an existing Annotation and add a new annotated point to it |
| DeletePoint | Delete a point from an annotation |
| QueryAllowedPointTypes | Return the allowed point types and subtypes given a data source type and subtype |
| QueryDataSourceSubtypes | Return the configured data source subtypes given a data source type |

*FIG. 3D*

| Data Source Type | Point Type | Meta Information |
|---|---|---|
| Relational (and Excel) | Table | Table Name |
| | Column | Table Name, Column Name |
| | Cell | Table Name, Key, Column Name |
| | Row | Table Name, Key |
| Word Document/HTML file | Document | Path |
| | Word Range | Path, Start character, End character |
| Spotfire File | Spot | Context, View, Marked Record, Column |
| | Cluster | Context, View, Marked Record, Column |
| | Row | Context, View, Marked Record |
| | Column | Context, View, Column |
| | File | Context, View |
| Pdf (requires Adobe Framemaker) | Text | Page, Start word, End word, Start of set, End of set |
| | Graphic | Page, Top, Left, Bottom, Right |

UNIVERSAL ANNOTATION CONFIGURATION AND DEPLOYMENT

CROSS-REFERENCE TO RELATED APPLICATIONS

The present application is related to commonly-owned U.S. Pat. No. 6,519,603, entitled "Method And System For Organizing An Annotation Structure And For Querying Data And Annotations", commonly-owned, co-pending application 10/083,075, entitled "Improved Application Portability And Extensibility Through Database Schema And Query Abstraction," commonly owned, co-pending application 10/310,192, entitled "Annotation Validity Using Partial Checksums," and commonly owned co-pending application, entitled "Heterogeneous Multi-Level Extendable Indexing For General Purpose Annotation Systems," filed herewith, which are herein incorporated by reference.

BACKGROUND OF THE INVENTION

1. Field of the Invention

The present invention relates to the field of data entry and retrieval and, more particularly, to a method and system for annotating a variety of heterogeneous data objects manipulated by a variety of different applications.

2. Description of the Related Art

There are well known methods for capturing and storing explicit knowledge as data, for example, in relational databases, documents, flat files, and various proprietary formats in binary files. Often, such data is analyzed by various parties (e.g., experts, technicians, managers, etc.), resulting in rich interpretive information, commonly referred to as tacit knowledge. However, such tacit knowledge is often only temporarily captured, for example, as cryptic notes in a lab notebook, discussions/conversations, presentations, instant messaging exchanges, e-mails and the like. Because this tacit knowledge is typically not captured in the application environment in which the related data is viewed and analyzed, it is often lost.

One approach to more permanently capture tacit knowledge is to create annotations containing descriptive information about data objects. Virtually any identifiable type of object may be annotated, such as a matrix of data (e.g., a spreadsheet or database table), a text document, or an image. Further, subportions of objects (sub-objects) may be annotated, such as a cell, row, or column in a database table or a section, paragraph, or word in a text document. An indexing scheme is typically used to map each annotation to the annotated data object or sub-object, based on identifying information, typically in the form of an index. The index should provide enough specificity to allow the indexing scheme to locate the annotated data object (or sub-object). Further, to be effective, the indexing scheme should work both ways: given an index, the indexing scheme must be able to locate the annotated data object and, given an object, the indexing scheme must be able to calculate the index for use in classification, comparison, and searching (e.g., to search for annotations for a given data object).

However, a number of challenges are presented when annotations must be made for objects from a variety of different type (i.e., heterogeneous) data sources manipulated by a variety of different application programs, which is a fairly common scenario in modern business enterprises. For example, in a biomedical enterprise, annotations may need to reference text documents (manipulated by a word processor/text editor), experimental data (manipulated by a database or spreadsheet application), genomic data (manipulated by a specialized application), images (manipulated by an image viewing application), and the like.

One challenge presented is how to index annotations (e.g., in a way that associates the annotations to the annotated data objects) because different types of objects manipulated by different applications, as well as different types of objects manipulated by the same application, have different ways of identifying themselves. Further, each object may also have a different number and type of sub-objects, resulting in different types of identifying information (e.g., indexes) for each. For example, a database table may be identified using four parameters (location, table, row, and column), while a text document may be identified using five parameters (location, file, section name, paragraph, and word). Ideally, the indexing method for each type of object would be allowed to be different, while still allowing the use of existing database indexing technology for organizing indexes made for a wide variety of data objects.

Another challenge is to provide a universal mechanism for managing annotations created for the various data objects manipulated by the various applications. Preferably, the mechanism would be easily accessible from within the application or applications used for creating and viewing the data to be annotated. Providing an annotation interface from within the applications used to view and analyze the data may encourage capturing and sharing tacit knowledge contained within annotations, which may foster collaboration and increase efficiency. For example, a group of people working to develop a new drug may share insights, speeding development of the drug, and bringing the drug to market faster which may reduce cost and, ultimately, save lives.

Accordingly, there is a need for improved methods and systems for managing annotations made for a variety of different data objects. Preferably, the methods and systems will allow annotations to be created and accessed from within a variety of different type applications used to view and analyze the annotated data objects, thus providing cross-platform tacit knowledge management.

SUMMARY OF THE INVENTION

The present invention generally is directed to methods, systems, and articles of manufacture for managing annotations created for a variety of different type objects manipulated by a variety of different applications.

One embodiment provides a method for deploying an annotation system in an enterprise. The method generally includes identifying processes within the enterprise, identifying roles related to the processes, identifying annotatable data objects related to the processes, identifying annotation metadata to be kept for each combination of at least one role and at least one annotatable data object, and creating annotation structures, for each combination of at least one role and at least one scope, containing fields associated with the identified annotation metadata associated with the combination.

Another embodiment provides a method for exchanging information between entities on a network. The method generally includes installing an annotation management system on the network, identifying a plurality of annotatable data objects manipulated by a plurality of applications on the network, and providing a set of one or more configuration tools allowing a user to define an annotation structure containing one or more annotation fields and associate the annotation structure with at least one of the annotatable data objects.

Another embodiment provides a computer-readable medium containing an executable component for configuring an annotation system for managing annotations created for data objects manipulated by one or more applications on a network. When executed by a processor, the executable component performs operations generally including providing at least one graphical user interface screen for defining annotation structures containing one or more annotation fields and providing at least one graphical user interface screen for associating annotation structures with at least one annotatable data object.

Another embodiment provides a system for managing annotations for one or more different type data sources manipulated by a plurality of different type applications. The system generally includes an annotation database for storing annotations separately from the data sources associated with the annotations, a set of annotatable data object points defining portions of the data sources associated with the annotations described by the associated annotations, an annotation server, and a set of one or more configuration tools. The annotation server is generally configured to receive requests to access annotations for one or more of the annotatable data object points issued by the one or more of the applications running on the client computer and generate a graphical user interface screen, based on an annotation structure associated with the one or more of the annotatable data object points, for creating or viewing annotations for the one or more annotatable data object points. The configuration tools allow a user to define annotation structures and associate annotation structures with one or more of the annotatable data object points.

BRIEF DESCRIPTION OF THE DRAWINGS

So that the manner in which the above recited features, advantages and objects of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

FIG. 3D illustrates a list of exemplary annotation application programming interface (API) functions, according to one embodiment of the present invention.

FIG. 4C is a table listing exemplary annotatable data sources and data points, according to one embodiment of the present invention.

FIGS. 9A and 9B are exemplary graphical user interface (GUI) screens for viewing data and annotations according to one embodiment of the present invention.

FIGS. 10A-10C are exemplary graphical user interface (GUI) screens for searching annotations and annotated data according to one embodiment of the present invention.

DETAILED DESCRIPTION OF THE PREFERRED EMBODIMENTS

Figure 1:
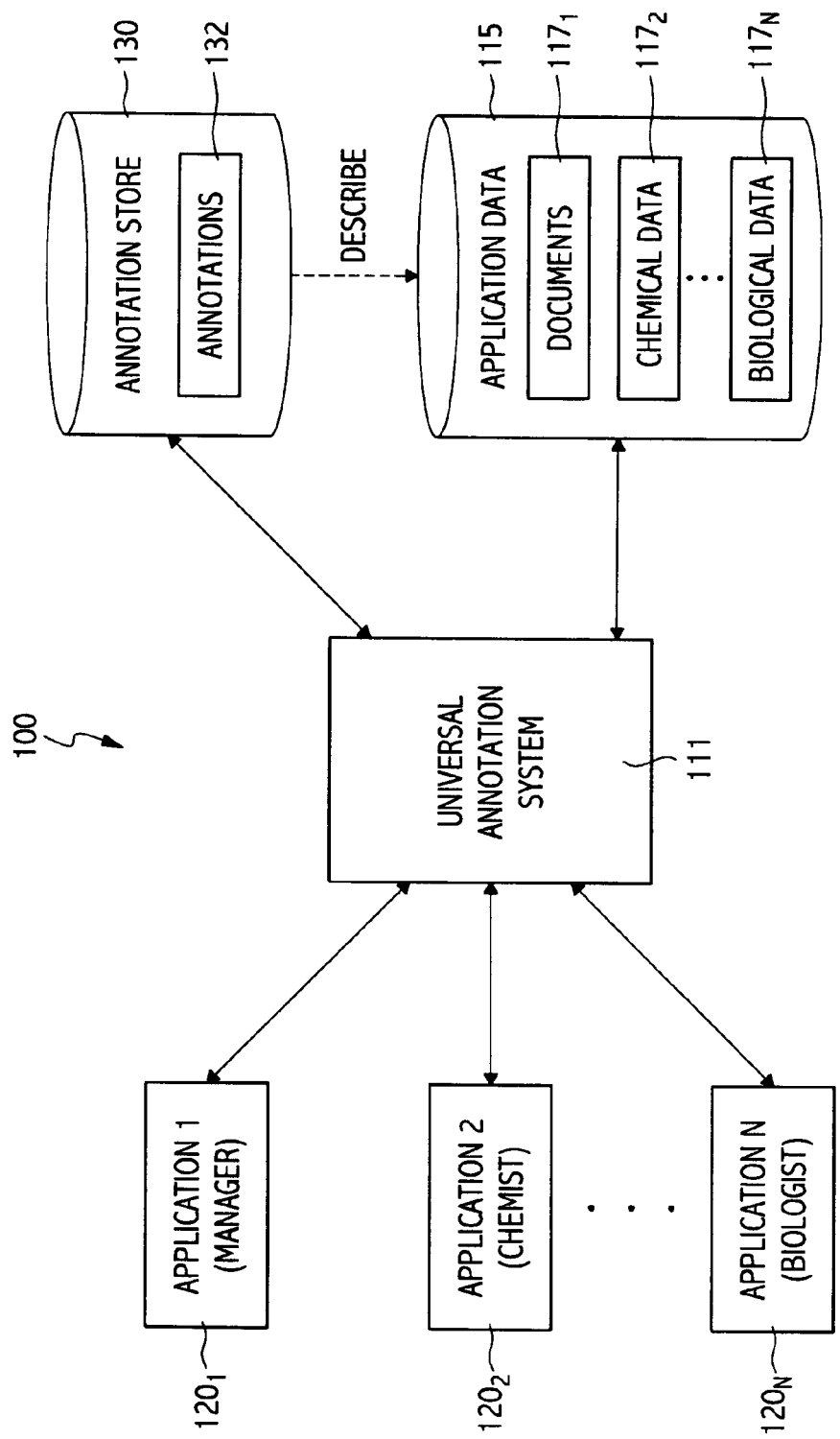
FIG. 1 is an exemplary computing environment in which embodiments of the present invention may be utilized.

The present invention provides methods, systems, and articles of manufacture that may be used for universal (e.g., cross-platform) management of annotations made for a variety of different type data objects manipulated (e.g., created, edited, and viewed) by a variety of different type applications. Some embodiments allow users collaborating on a project to create, view, and edit annotations from within the applications used to manipulate the annotated data objects, which may facilitate and encourage the capturing and sharing of tacit knowledge through annotations. Further, annotations may be stored separate from the application data they describe, decoupling the tacit knowledge captured in the annotations from the applications used to manipulate the annotated data. Thus, even if collaborators migrate away from a specific application, the tacit knowledge captured in the annotations may remain available.

As used herein, the term annotation generally refers to any type of descriptive information associated with one or more data objects. Annotations may exist in various forms, including textual annotations (descriptions, revisions, clarifications, comments, instructions, etc.), graphical annotations (pictures, symbols, etc.), sound clips, etc. While an annotation may exist in any or all of these forms, to facilitate understanding, embodiments of the present invention may be described below with reference to textual annotations as a particular, but not limiting, example of an annotation. Accordingly, it should be understood that the following techniques described with reference to textual annotations may also be applied to other types of annotations, as well, and, more generally, to any type of reference to a data object.

Further, as used herein, the term user may generally apply to any entity utilizing the annotation system described herein, such as a person (e.g., an individual) interacting with an application program or an application program itself, for example, performing automated tasks. While the following description may often refer to a graphical user interface (GUI) intended to present information to and receive information from a person, it should be understood that in many cases, the same functionality may be provided through a non-graphical user interface, such as a command line and, further, similar information may be exchanged with a non-person user via a programming interface.

One embodiment of the invention is implemented as a program product for use with a computer system such as, for example, the enterprise system 100 shown in FIG. 1 and described below. The program(s) of the program product defines functions of the embodiments (including the methods described herein) and can be contained on a variety of signal-bearing media. Illustrative signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); or (iii) information conveyed to a computer by a communications medium, such as through a computer or telephone network, including wireless communications. The latter embodiment specifically includes information downloaded from the Internet and other networks. Such signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The software of the present invention typically is comprised of a multitude of instructions that will be translated by the native computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular nomenclature that follows is used merely for convenience, and thus the invention should not be limited to use solely in any specific application identified and/or implied by such nomenclature.

An Exemplary Environment

FIG. 1 illustrates an exemplary enterprise system 100 in which a universal annotation system 111 in accordance with the present invention may be utilized to exchange information, captured in the form of annotations 132, between users collaborating on a project. The universal annotation system 111 may be provided to members of such an industry, for example, from a service provider in the business of installing such systems. In an effort to ensure successful deployment of the annotation system, the service provider may address both the capture and harvest (retrieval) of tacit knowledge in the form of annotations 132. The capture process generally involves users (e.g., people or, in some cases, application programs) entering annotation content about some item of "target" data.

As previously described, the target data may be of any suitable type, such as textual or tabular (structured, usually non-textual), graphical, or any other type maintained in any type data source, such as a text document, flow diagram, schematic (e.g., electrical or mechanical) or any multimedia file (e.g, an audio file, image file, or video clip). During the capture process, the user entering the annotation content will typically be interacting with software that could be either embedded within their particular scientific applications (e.g., as a plug-in component) or, alternatively, with a separate annotation application that is external to their scientific applications, for example, a stand-alone browser. The annotations 132 may be stored in a central annotation repository (e.g., an annotation store 130), which may be searched independently or in conjunction with the annotated data, thus allowing users to harvest knowledge captured by other users about the data of interest.

For example, the annotations 132 may capture insights of different users, such as a manager, chemist, and biologist, working an a biomedical enterprise. The annotations 132 may include annotations that describe various type data objects contained in various data sources, such as documents $117_1$ (e.g., project status reports) generated by the manager with a first application $120_2$ (e.g., a word processor), chemical data $117_2$ manipulated (e.g., created/viewed/edited) by the chemist with a second application $120_2$ (e.g., a database application), and biological data $117_N$ (e.g., genomic data) generated by a biologist with an $N^{th}$ application $120_N$ (e.g., a database application or specialized genomic data application).

Storing the annotations 132 in the annotation store 130 may allow tacit knowledge to be captured about the data without modifying the data sources containing the data. It should understood, however, that the annotation store 130 may actually reside on the same system as the annotated data sources. In either case, the various application data 115 are enhanced with the opinions and evaluations of experts (e.g., chemists, biologists, and managers), and this supplementary knowledge is made available to others via the annotation system 111.

As will be described in greater detail below, the annotation system 111 may be integrated with the rest of the enterprise system 100 through an independent annotation browser and plug-in components communicating with a central annotation server, allowing annotations to be manipulated from the same applications 120 used throughout the enterprise to manipulate the annotated data. Thus, the annotation system 111 provides a means for capturing and sharing tacit knowledge that can be analyzed and used in connection with the existing processes, in a wide variety of industries.

Figure 2:
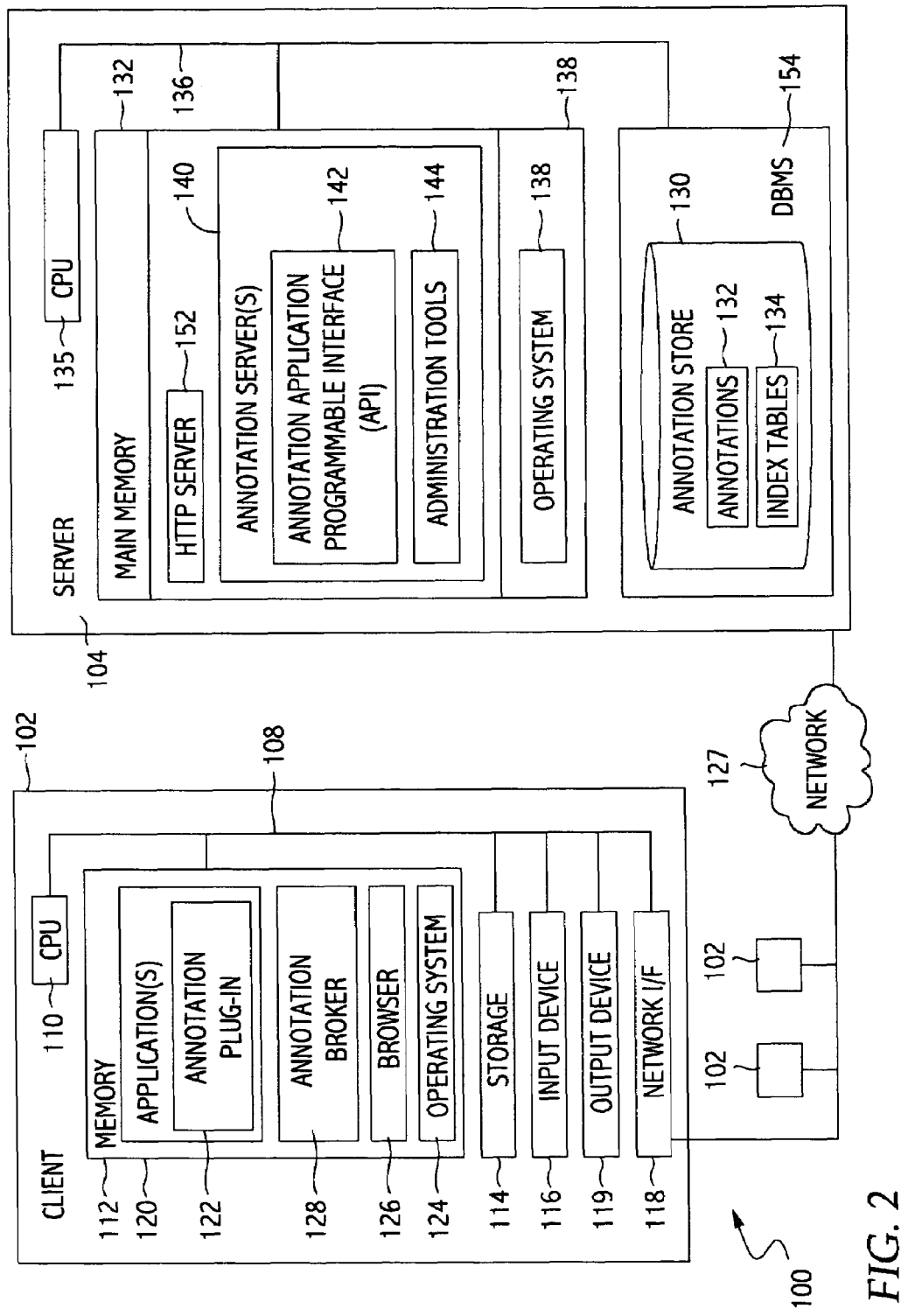
FIG. 2 is a client server view of one embodiment of the computing environment of FIG. 1.

Referring now to FIG. 2, a client-server view of one embodiment of the enterprise system 100 is shown. As illustrated, the system 100 generally includes one or more client computers 102 (e.g., user workstations) generally configured to access annotations 132 in an annotation store 130, via the annotation server 140 (e.g., a software component) running on at least one server computer 104. The client computers 102 and server computer may be connected via a network 127. In general, the network 127 may be any combination of a local area network (LAN), a wide area network (WAN), wireless network, or any other suitable type network, including the Internet.

As illustrated, the client computers 102 generally include a Central Processing Unit (CPU) 110 connected via a bus 108 to a memory 112, storage 114, input devices 116, output devices 119, and a network interface device 118. The input devices 116 may be any devices to give input to the client computer 102, such as a mouse, keyboard, keypad, light-pen, touch-screen, track-ball, or speech recognition unit, audio/video player, and the like. The output devices 119 may be any suitable devices to give output to the user, including speakers and any of various types of display screen. Although shown separately from the input device 116, the output device 119 and input device 116 could be combined (e.g., a display screen with an integrated touch-screen.

The network interface device 118 may be any entry/exit device configured to allow network communications between the client computer 102 and the server computer 104 via the network 127. For example, the network interface device 118 may be a network adapter or other network interface card (NIC). Storage 114 is preferably a Direct Access Storage Device (DASD). Although shown as a single unit, storage 114 may be any combination of fixed and/or removable storage devices, such as fixed disc drives, floppy disc drives, tape drives, removable memory cards, or optical storage. The memory 112 and storage 114 could be part of one virtual address space spanning multiple primary and secondary storage devices.

The memory 112 is preferably a random access memory (RAM) sufficiently large to hold the necessary programming and data structures of the invention. While the memory 112 is shown as a single entity, it should be understood that the memory 112 may in fact comprise a plurality of modules, and that the memory 112 may exist at multiple levels, from high speed registers and caches to lower speed but larger DRAM chips. Illustratively, the memory 112 contains an operating system 124. Examples of suitable operating systems, which may be used to advantage, include Linux and Microsoft's Windows®, as well as any operating systems designed for handheld devices, such as Palm OS®, Windows® CE, and the like. More generally, any operating system supporting the functions disclosed herein may be used.

The memory 112 is also shown containing at least one application 120 (optionally shown with an associated annotation plug-in 122 and an annotation broker 128). The application 120 may be any of a variety of applications used to manipulate (e.g., create, view, and/or edit) data that may be annotated. For example, the application 120 may be a text editor/word processor used to manipulate annotatable documents, a database application or spreadsheet used to manipulate data, a document generator/viewer (such as Adobe's Acrobat ® and Acrobat Reader) used to manipulate documents, or data analysis software, such as Decision Site available from Spotfire, Inc., imaging software used to manipulate images, and any other types of applications used to manipulate various types and forms of data.

Some application programs 120 may be configured to communicate with the annotation server 140 directly, for example, via a set of application programming interface (API) 142 functions provided for the annotation server 140. As used herein, the term API generally refers to any set of interface functions (e.g., implementing any suitable inter-process protocol) that may be used to communicate between a client computer or process and a server computer or process. Other application programs, however, may communicate with the annotation server 140 via plug-in components 122 and/or the annotation broker 128 (e.g. also via the API 142). In other words, annotation capability may be added to an existing application 120 via the plug-in components 122. The plug-in components 122 may, for example, present graphical user interface (GUI) screens to users of applications 120, thus allowing the creation and retrieval of annotations from within the applications used to manipulate the annotated data.

The annotation broker 128 is an optional component and may be implemented as a software component configured to present a standard interface to the Annotation Server 140 from various applications 120, for example, communicating with plug-in components 122 from multiple applications running on the same client computer 102. Hence, the annotation broker 128 may provide a degree of separation between the applications 120 and the annotation server 140, hiding detailed operation of the annotation server 140 and facilitating development of plug-in components 122. In other words, new applications 120 may be supported through the development of plug-in components 122 written in accordance with the annotation broker interface.

Components of the server computer 104 may be physically arranged in a manner similar to those of the client computer 102. For example, the server computer 104 is shown generally comprising a CPU 135 and a memory 132, and a storage device 154, coupled to one another by a bus 136, which may all functions as similar components described with reference to the client computer 102. The server computer 104 is generally under the control of an operating system 138 (e.g., IBM OS/400®, UNIX, Microsoft Windows®, and the like) shown residing in memory 132.

As illustrated, the server computer 104 may be configured with the annotation server 140, also shown residing in memory 132. The annotation server 140 provides client computers 102 with access to the annotation store 130, for example, via the annotation API 142. As will be described in greater detail below, the annotation server 140 may be configured to perform a variety of operations, such as responding to requests to create annotations for specified data objects, formulating and issuing queries against the annotation store 130 to search for annotations for a specified data object, and formulating and issuing queries against the annotation store 130 to search for annotations satisfying one or more specified conditions (e.g., having a specified author, creation date, content, and the like).

As will be described in greater detail below, the annotation server 140 may be configured to perform a variety of operations, such as responding to requests to create annotations for specified data objects, formulating and issuing queries against the annotation store 130 to search for annotations for a specified data object, and formulating and issuing queries against the annotation store 130 to search for annotations satisfying one or more specified conditions (e.g., having a specified author, creation date, content, and the like).

For some embodiments, a distributed annotation system for an enterprise may comprise a plurality of distributed annotation servers 140, for example, each running on a different server computer 104. Each distributed annotation server 140 may support a different set of users (e.g., different departments, or even different geographic locations, within a common enterprise or separate enterprises, etc.), and may maintain a separate annotation store 130. However, each distributed annotation server 140 may be configured to access annotation content from annotation stores 130 maintained by other annotation servers 140 (e.g., directly, or through communication with the corresponding maintaining annotation servers 140), thus allowing annotations to be created and shared by a wide range of users throughout a distributed enterprise.

For some embodiments, the annotation server 140, and various related components, may be configured via a set of administrative tools 144. For example, the tools 144 may be used to generate a set of annotation configuration files 148, which may contain various information, such as a set of annotation template structures for use in displaying and collecting annotation information, the various annotatable data source types and indexing thereof, the roles in which users may operate, and other defining information which may affect operation of the annotation server 140. The annotation structures may contain a set of fields and groups of fields that determine what data is stored with the annotation and what data is presented to a user viewing the annotation, for example, based on the user's role.

A Relational View Of The Annotation System

Figure 3A:
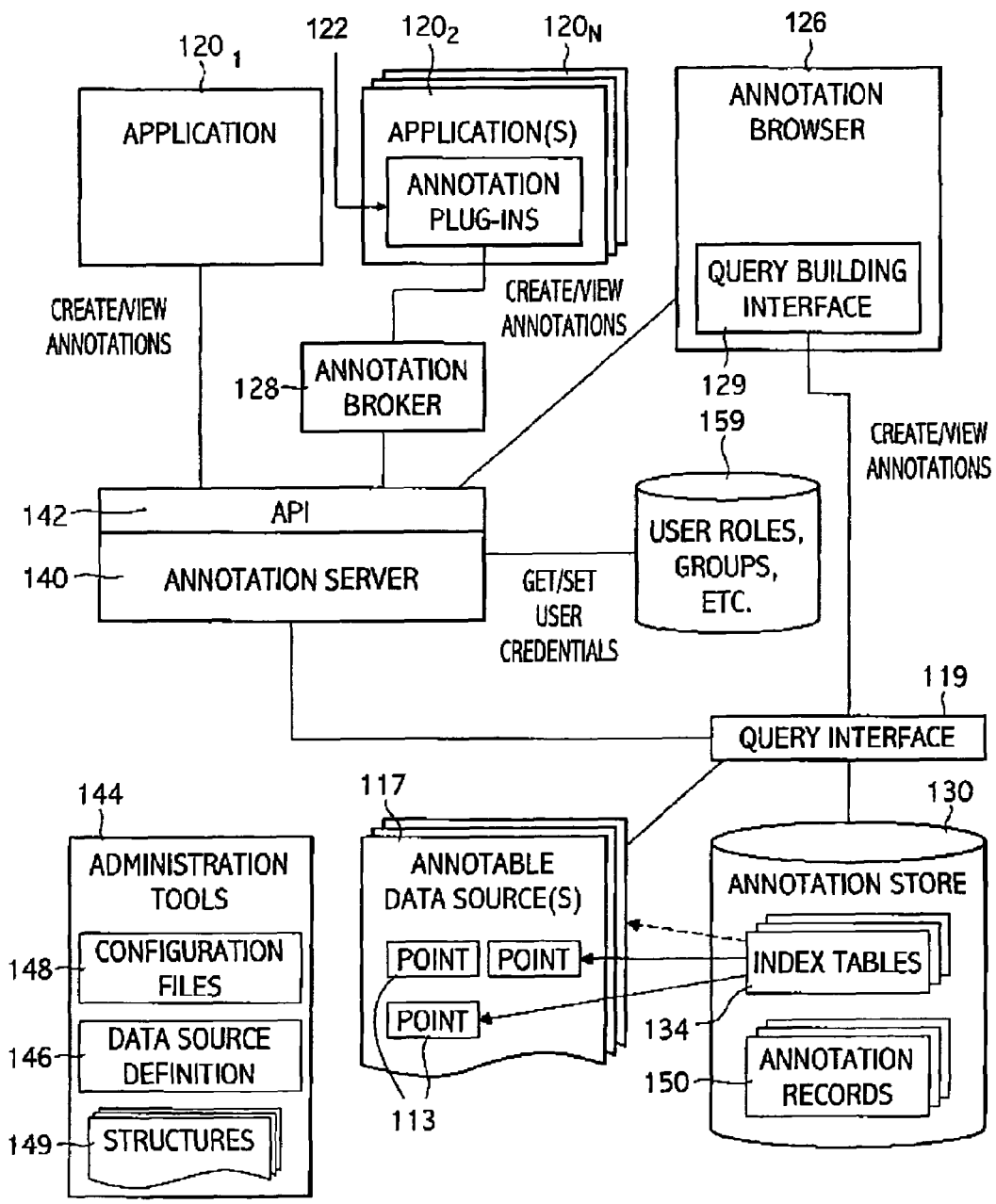
FIG. 3A is a relational view of an annotation system according to one embodiment of the present invention.

FIG. 3A illustrates a relational view of the annotation server 140 and various other components of the annotation system, in accordance with one embodiment of the present invention. As previously described, one or more applications 120 (e.g., residing on one or more client computers 102) may communicate with the annotation server 140 either directly (e.g., application $120_1$) or via the annotation plug-ins 122 and/or annotation broker 128 (e.g., applications 120₂-120ₙ), to create or view annotations for data object manipulated by the applications 120.

As illustrated, the annotation server 140 may issue queries against the annotation store 130 via a query interface 119. For some embodiments, the annotation server 140 may issue abstract queries against the annotation store 130 and the query interface 119 may be an abstract query interface configured to map logical fields of the abstract query to corresponding physical fields of the annotation store 130. The concepts of data abstraction and abstract queries are described in detail in the commonly owned, co-pending application Ser. No. 10/083,075, entitled "Improved Application Portability And Extensibility Through Database Schema And Query Abstraction," filed Feb. 26, 2002, herein incorporated by reference in its entirety.

As illustrated, the annotation broker 128 may serve as an interface between annotation plug-ins 122 for multiple applications and the annotation server 140. For example, the annotation broker 128 may manage messages sent to and from multiple annotation plug-ins and the annotation server (e.g., providing mediation between multiple plug-in components 122 trying to access the annotation server 140 simultaneously). For some embodiments, the annotation broker 128 may be implemented as a Windows Component Object Model (COM) server that provides a standard interface and facilitates access to the annotation server 140 for annotation plug-ins 122 for Windows applications (e.g., Microsoft Internet Explorer, Microsoft Word, Microsoft Excel, Adobe Acrobat, Spotfire, and other Windows applications). In other words, by providing a standard interface to the annotation server 140, the annotation broker 128 may facilitate extension of the annotation system to support new applications 120 through the development of plug-in components written in accordance with its interface.

As illustrated, an annotation browser 126 may allow the creation and viewing application data and annotations, independently of any of the applications 120. For some embodiments, the annotation browser 126 may provide a generalized web-based user interface for viewing structured data content (e.g. application source data that can be accessed directly through queries via the query interface 119), and for creating and viewing annotations on it. As will be described in greater detail below, for some embodiments, the annotation browser may provide an interface allowing a user to simultaneous query data sources 117 and associated annotations 132.

For some embodiments, in order to identify annotated data object(s), an index, or set of indexes, that may be used to identify the corresponding annotated data object(s) may be stored with the annotation data. As illustrated, an index obtained from an annotation record may be used to retrieve information from one or more index tables 134 that may be used to identify the annotated data object or sub-objects, commonly referred to as annotated points 113.

As user herein, the term point may generally refer to any identifiable data unit (or group of data units) capable of being annotated. Examples of annotatable points include, but are not limited to, database tables, rows, columns, cells, or groups of cells, selected portions of a text document (e.g., defined by an offset and length, start and stop locations, or any other suitable defining information), and the like. Multiple points in an object may be referenced by the same annotation and any point in an object may be referenced by multiple annotations. Further, as indicated by the dashed arrow from the index table 134 in FIG. 3A, an annotation may reference points in more than one annotatable data source 117. For some embodiments, additional points may be associated with an annotation, for example, via the annotation API 142, in effect propagating the annotation to the additional points.

In some cases, annotations may also be created and managed that are not associated with any particular point. For example, such annotations may facilitate the capture of insights that are more general in nature than annotation made for specific annotatable points. However, the method and systems described herein may still be utilized to advantage to create, organize, and search such annotations. For example, as described herein with reference to "point-specific" annotations, such annotations may also be created and viewed using one or more annotation structures.

Heterogeneous Indexing

Upon retrieving an annotation record 150 from the annotation store, using the index stored therein, the object described by the annotation can be found from the information within the annotation record, and, conversely annotations for a given object can be looked up in the annotation store, based on an index generated from it's identifying information. Thus, the indexes provide the ability to find corresponding data from annotations and to find annotations associated with data. Because different type data objects have different identifying parameters (e.g., database entities may be identified by table, column and/or row values, while portions of text documents may be identified by an offset and length or start and stop values within the document, etc.) different indexing methods may be used depending on the type of the annotated data object.

Data sources are typically arranged as "granular" hierarchical structures of different "levels" of data objects, each of which may be annotated for different reasons. For example, a database table may be annotated to explain why it was created (its purpose), a database column may be annotated to clarify what type of data is stored therein, a database row may be annotated to comment on a particular set of data (e.g., all related to a common patient), while a database cell may be annotated to comment on the significance of a particular value stored therein (e.g., an alarmingly high test result). In general, higher level data objects may be identified by indexes with fewer column values than indexes for lower level data objects (which may be regarded as sub-objects of the higher level data objects).

Figure 3B:
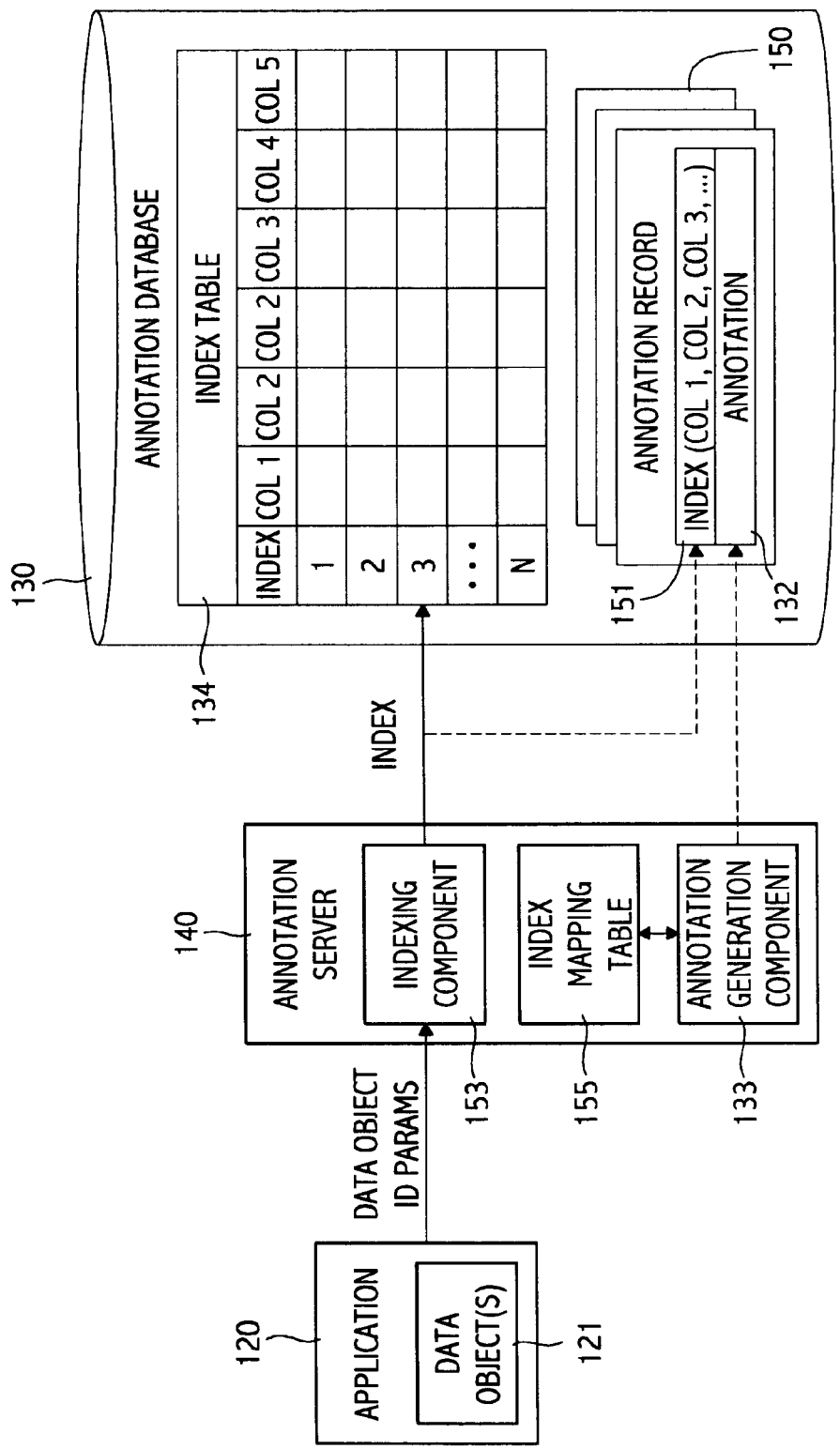
FIGS. 3B and 3C illustrate relational views of exemplary indexing components, according to one embodiment of the present invention.
Figure 3C:
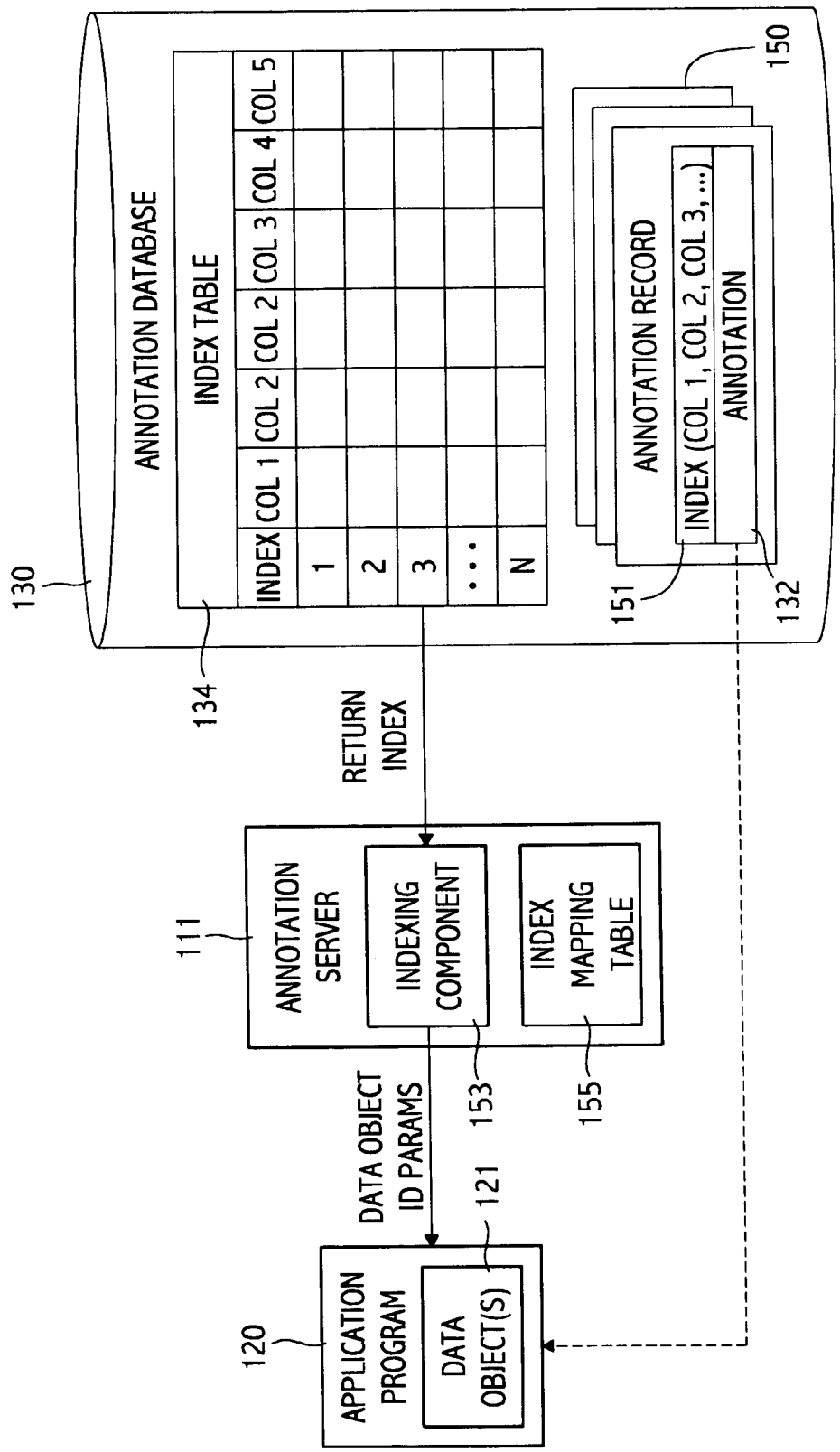

Examples of suitable techniques for indexing a variety of different type data objects are described in detail in a commonly owned co-pending application, entitled "Heterogeneous Multi-Level Extendable Indexing For General Purpose Annotation Systems," filed herewith, hereby incorporated by reference. FIGS. 3B and 3C illustrate components utilized in one exemplary indexing technique described in the above-referenced application, during annotation generation and retrieval, respectively, that may also be used in accordance with embodiments of the present invention.

As illustrated in FIG. 3B, upon creating an annotation, an indexing component 153 of the annotation server may calculate an index 151 based on one or more identifying parameters of the annotated data object 121 manipulated by an application program 120. The indexing component may determine the type of the annotated data object 121 and select an index mapping table 155 containing mapping functions used to map the identifying (ID) parameters of the data object 121 to a set of columns values in an index table 134. In other words, the index mapping tables 154 may be used to map different type ID parameters for a heterogeneous set of data objects to a homogenous set of index values. As described in the above-referenced application, different mapping tables 155 may be provided for each type of data source (database table, text document, PDF file, etc.), allowing sub-objects of each type to be mapped to the common index column values.

The index table 134 may be queried separately to determine if annotations exist for a specified data object (or sub-objects thereof), for example, in order to provide an indication (e.g., an icon) in the application program 120 of which data objects have annotations. In other words, the existence of an index for a data object in the index table 134 indicates an annotation has been made for that data object. As illustrated in FIG. 3C, upon retrieving an annotation from the annotation database 130, the indexing component may convert an index for a retrieved annotation into a set of ID parameters, allowing the application program 120 to identify the data object associated with the annotation. For some embodiments, actual annotations may not be retrieved, however, until a user requests them, for example, by clicking on a corresponding annotation icon with a mouse.

Annotation API

As previously described, for some embodiments, the annotation API 142 may provide an interface between the annotation server 140 and annotation clients, such as application programs 120 coded to the API, application programs 120 enabled for annotation via plug-in components 122, and the annotation browser 126. The annotation API 142 may include various functions that enable annotation clients to perform a variety of annotation-related functions. FIG. 3D is a table 480 illustrating a sample of possible API functions that may be included in the annotation API 142, according to one embodiment of the present invention.

As illustrated in the table 480, the annotation API 142 may include functions allowing annotation clients to query the annotation system to retrieve a wide variety of information regarding annotations for specified data objects (e.g., QueryStructureNames, QueryStructureTransforms, QueryAllowedPointTypes, QueryDataSourceSubtypes, and GetAnnotation), retrieve a wide variety of information regarding data objects described by annotations (e.g., QueryPoints). Annotation data may also be queried for data satisfying specified query conditions (e.g., QueryAnnotationIDs) and annotations may be created and/or edited annotations (e.g., AddPoint, DeletePoint, CreateAnnotation, UpdateAnnotation, and DeleteAnnotation). Further, functions may also exist for viewing and/or setting a user's role for an annotation session (e.g., QueryRoles and SetRole).

As will be noted at various locations in the following description, a sequence of API function calls may be made to accomplish some the operations described below. However, those skilled in the art will realize that the exact API functions and function names provided, parameters passed to and from the functions, and the exact functionality performed thereby may vary widely with different implementations, and that various functions may be combined in a single function or separated into separate functions as a designer sees fit. Therefore, while the following references may refer to the specific exemplary functions listed in FIG. 3D, it should be understood that actual sequences and functions used to perform any of the following operations will likely vary widely with different implementations.

Annotation System Configuration

Referring back to FIG. 3A, for some embodiments, the administrative tools 144 may be used to configure various components of the annotation system. For example, the administrative tools 144 may include a set of one or more application programs that provide a graphical user interface (GUI) that allows an administrator (generally defined as any user running the annotation tools 144) to navigate through the various configuration files 148, for example, to define roles, associate users with roles, define annotatable points for various data sources, and perform other type configuration operations, from a single interface. FIG. 4D illustrates exemplary operations 400 for configuring an annotation system that may be performed by a user, for example, using GUI screens provided by the administrative tools 144.

Prior to running the administrative tools 144 to configure an annotation system, however, the administrator may need to gather a variety of information used to determine how the annotation system should be configured (e.g., what data should be allowed to annotated and what type of information should be captured as annotations). This data gathering may be considered a precursor to actually configuring the annotation system, for example, with the goal of limiting the annotation system to supporting annotations on data for which the annotations are likely to be beneficial. In case the administrator is not too familiar with the system in which the annotation system is to be deployed, a domain expert, as well as another type consultant (e.g., a service provider in the business of installing annotation systems), may be consulted to ensure proper considerations are taken prior to configuring the annotation system.

Figure 4A:
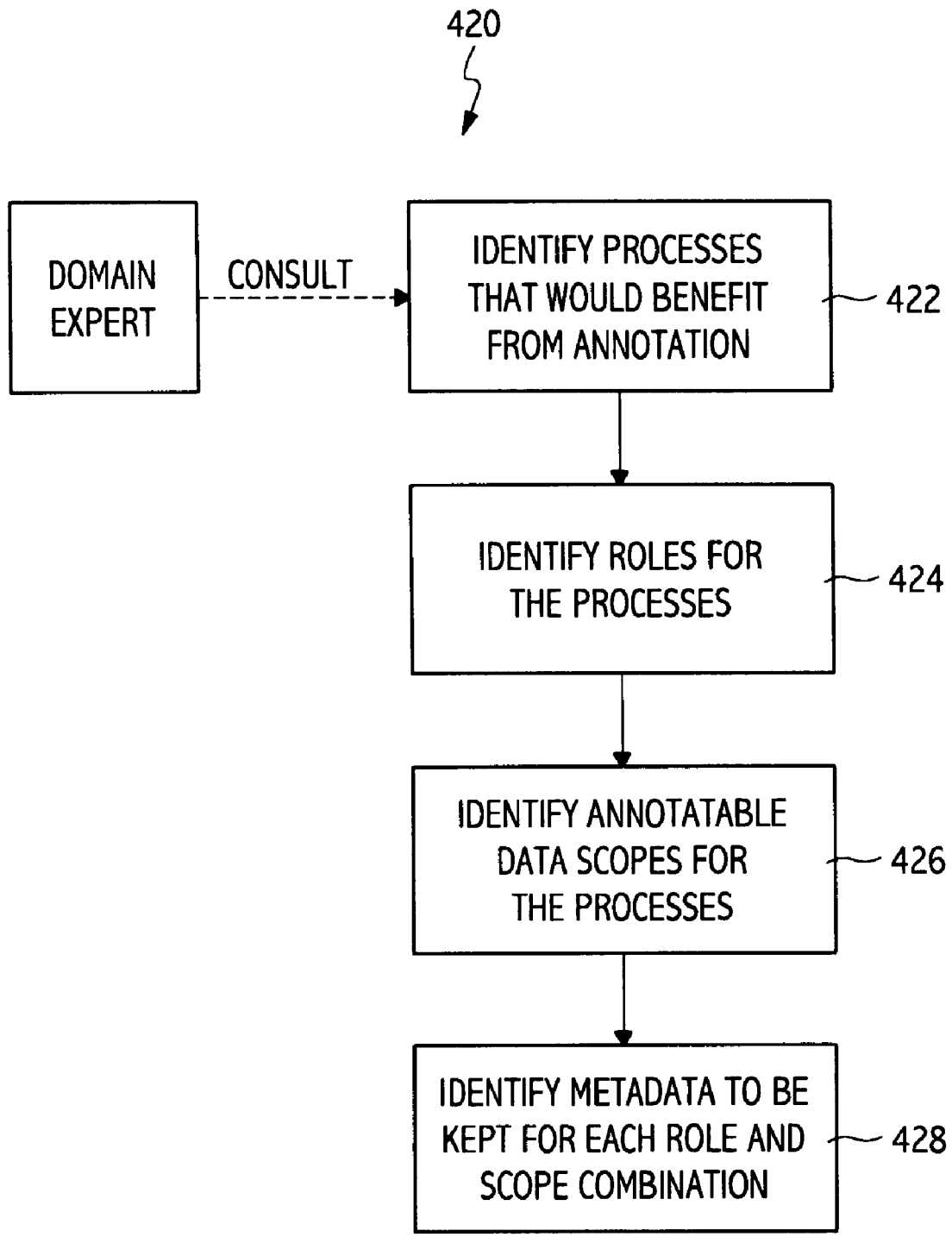
FIGS. 4A, 4B, and 4D are flow charts illustrating exemplary operations for configuring an annotation system according to one embodiment of the present invention.

FIG. 4A is a flow diagram of exemplary operations 420 that may performed, for example, by the administrator and/or domain expert, to determine how (and on what data) the annotation system should operate, in preparation of actually running the annotation tools 144. The operations 420 may be considered an audit, of sorts, to examine the domain in which the annotation system is to be deployed in an effort to tailor the annotation system configuration to the users and data of the domain.

The operations 420 begin, at step 422, by identifying processes that would benefit from annotation. For example, processes that involve subjective measures, expert judgment, and opinions as part of the process may all benefit from annotations. For later use in determining what fields should be annotated, the data kept for each of the processes may also be identified. Further, in case it is later determined that data kept for an identified process should be annotated, a determination of what information related to the data (referred to as metadata) should be captured in an annotation may also be made.

This determination may be made, for example, by exploring what types of questions a user analyzing the data is likely to ask, and may include factual information (e.g., what type of test equipment was used) and subjective information (e.g., are the results acceptable, is the data reliable, etc.). These questions may indicate what fields should be included in an annotation for a given data object. Further, consideration may be given as to whether sufficient motivation exists for individuals to provide the identified metadata (i.e., would a user be likely to create an annotation to capture the metadata).

At step 424, roles for the identified processes are identified. As previously described, the role in which a user acts may determine the type of information that user would be likely to capture in an annotation, or be interested in viewing in an annotation. For example, in a biomedical enterprise, a user acting in an accounting role may be more interested in project budget data, while a user acting in a research role may be more interested in technical test results. Consideration may also be given to how users in the various roles create, change, or consume information (e.g., a manager is likely to review and possibly approve work, while a researcher may simply comment on conditions under which data was gathered).

At step 426, annotatable data scopes for the processes are identified. The term annotatable data scope generally refers to exactly where (e.g., for what data object or location within a data object) an annotation is being made. As an entity may deal with a wide variety of data (e.g., related different topics, different disciplines, etc.), the insights captured (i.e., the metadata) for each different type of data may vary accordingly. In other words, the scope of data to be annotated may determine what type of information is captured for the corresponding annotation.

Figure 4B:
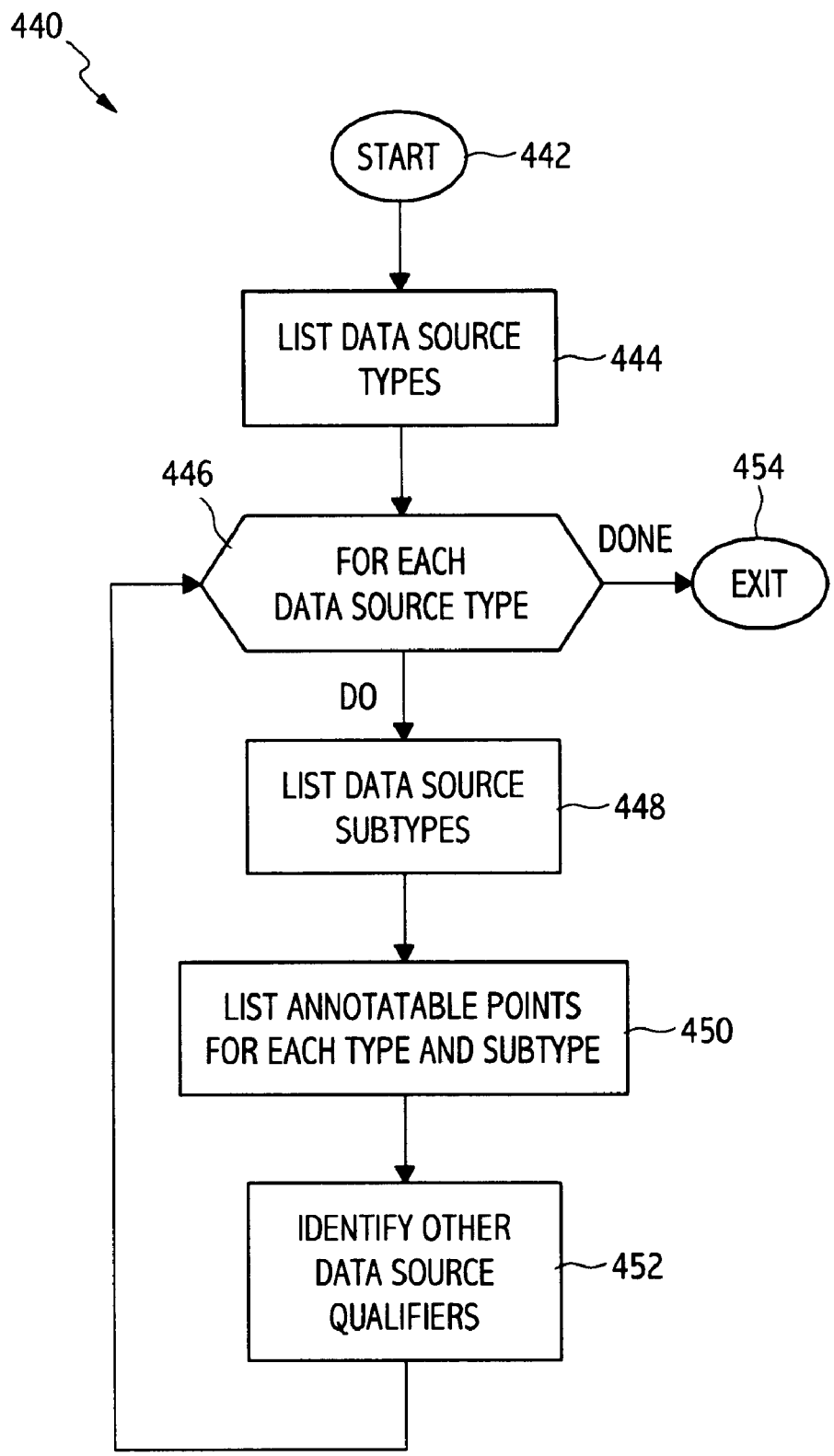
Figure 4D:
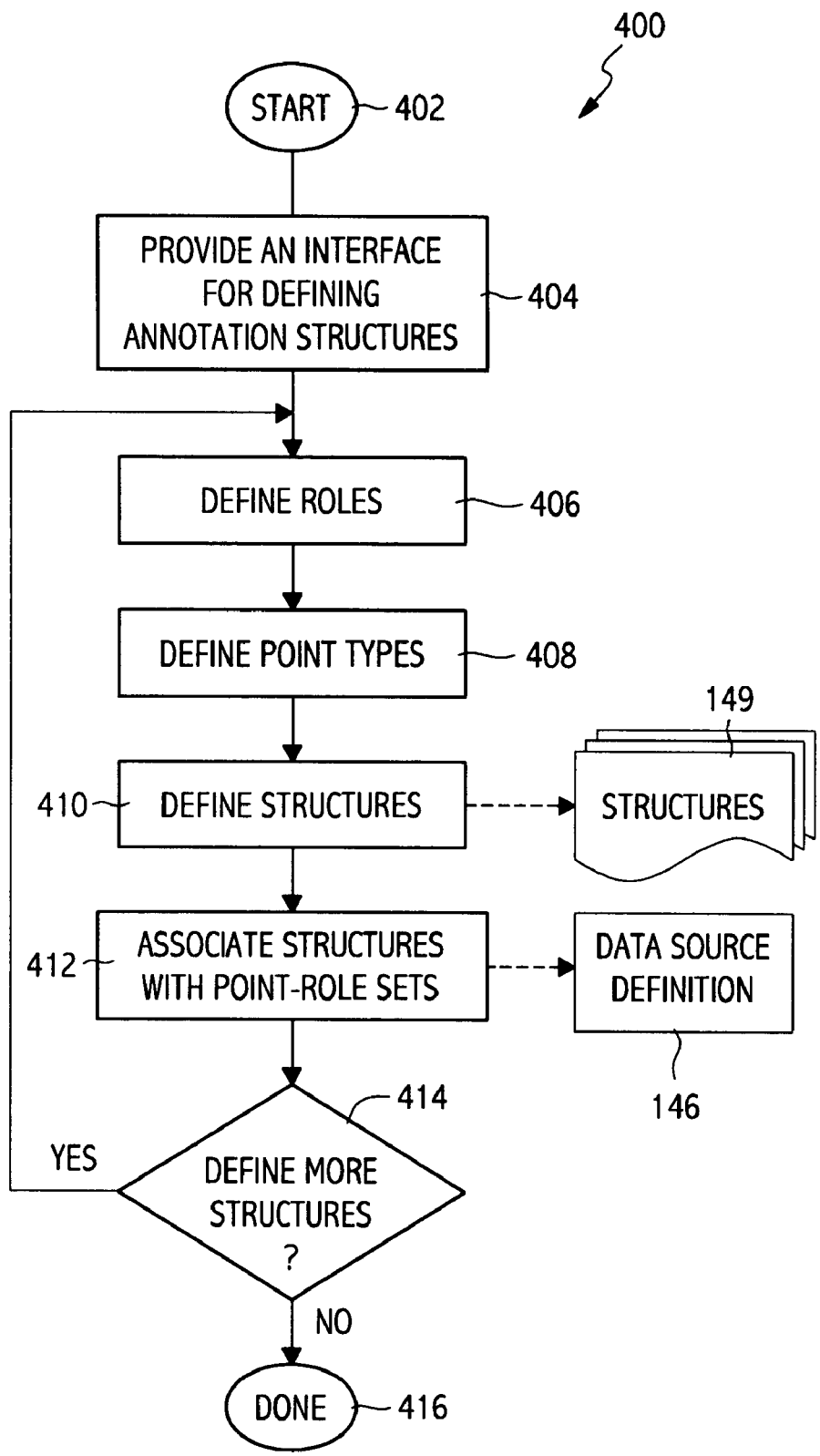

FIG. 4B illustrates exemplary operations 440 that may be performed to identify annotatable data scopes. The operations begin, at step 442 and, at step 444, available annotatable data sources are listed (e.g., database tables, spreadsheets, PDF documents, text documents, image files, or any type of identifiable data source). At step 446, a loop of operations (448-452) is entered to be performed for each of the listed data sources.

At step 448, data source subtypes are listed. Data source subtypes may be identified as cases where the content of a particular type of data source needs different type of metadata (captured in annotations) than other types. For example, for a database table, subtypes may include specific types of tables (e.g., a clinical data table, a personnel shift scheduling table, patient records, etc.), while for a text document, subtypes may include different types of documents (e.g., quality control documents, a resume, a patent application, etc.). As will be described in greater detail below, different annotation forms for use in creating annotations having different annotation fields may be presented to users, based on the data source subtype and selected point (and possibly a user role, as well).

At step 450, annotatable points for each type and subtype are listed. For example, as previously described, annotations for a database table may be made on a row, a column, a cell, or the entire table, while annotations for a text document may be made on the document or any section thereof (e.g., a group of words defined by a start character and stop character or offset and length).

FIG. 4C illustrates a table 460 that lists exemplary annotatable points for an exemplary set of data source types. Illustratively, the exemplary set of data source types includes relational data sources, such as database tables and spreadsheets, word documents, HTML files, Spotfire files, and PDF files. However, there is no limit to the data source types and annotatable points that may be supported, and the exact number and type supported may vary with different embodiments. The Meta Information column indicates information that may uniquely identify the corresponding annotatable point. While not shown, groups of more than one annotatable points may also be annotated.

At step 452, other data source qualifiers (e.g., that further specify an annotatable point) are listed. Examples of other data source qualifiers for a particular scope, include the name of an annotatable entity, such as a particular column name. In other words, such a source qualifier may allow annotations of one column to be different than the annotations of another column. As another example of a data source qualifier, the content of an selected annotatable data object may be qualified, for example, to include a specified search string, one or more keywords, a particular value, set, or range of values, and the like.

Referring back to FIG. 4A, at step 428, the metadata to be kept for each role and scope combination is identified. For example, the metadata to be kept for each role and scope combination may be identified by examining the different types of metadata that may be captured for each of the annotatable data scopes identified in step 426 and determining, which users (operating in which roles) are likely to be interested in this metadata (and/or authorized to access this metadata). As will be described in greater detail below, annotation structures with annotation fields based on the identified metadata may be generated and associated with the corresponding role and scope combination.

After the data gathering operations 420 of FIG. 4A have been performed, a user may be ready to run the administrative tools 140, for example, to create the data definition file 146, configuration files 148, and annotation structures 149. In general, the data definition file 146 may define which data sources 117, and points 113 contained therein, can be annotated.

FIG. 4D illustrates exemplary operations 400 that may be performed, via the administrative tools 144, to configure the annotation system with input from a user. The operations 400 may be described with reference to FIGS. 5A-5H that illustrate exemplary GUI screens that may be presented to the user as part of the administrative tools 144. Of course, it should be understood that the details of the GUI screens are for illustrative purposes only and that the operations 400 represent just some of the types of operations that may be performed to configure the annotation system, and that a user may be able to perform various other configuration processes via the administrative tools 144 or through any other configuration interface.

Figure 5A:
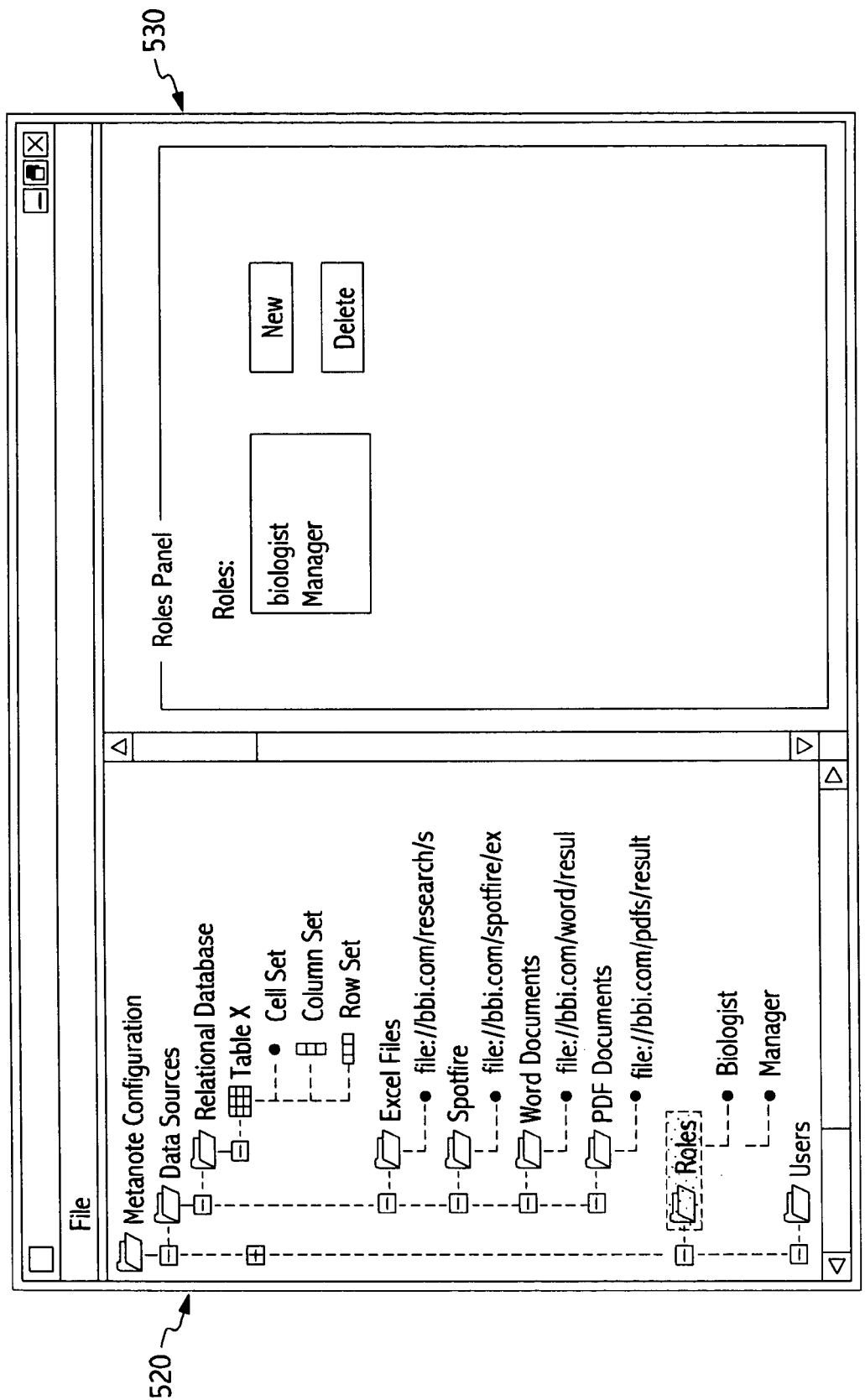
FIGS. 5A-5H illustrate exemplary graphical user interface (GUI) screens that may be used to configure an annotation system according to one embodiment of the present invention.
Figure 5B:
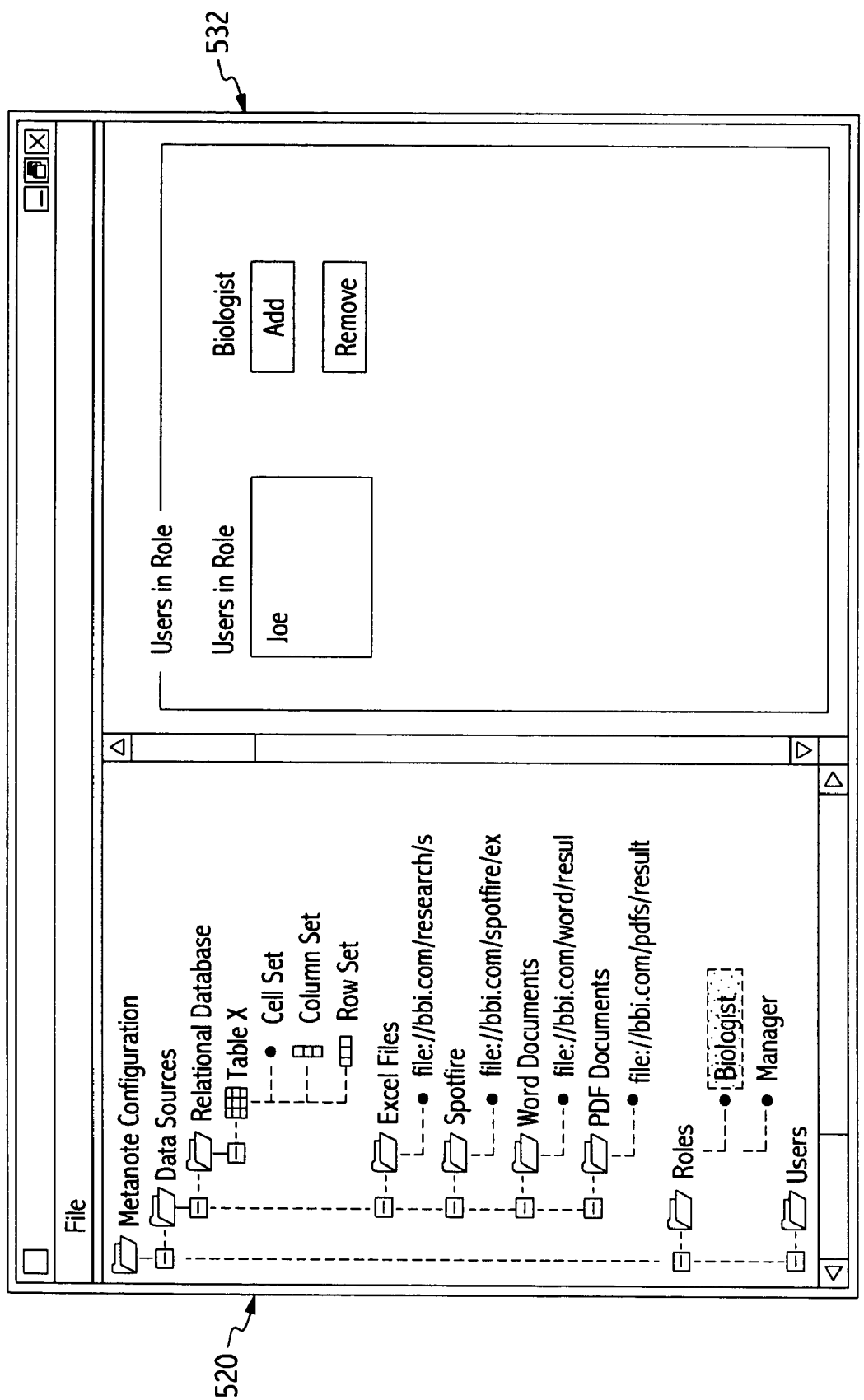
Figure 5C:
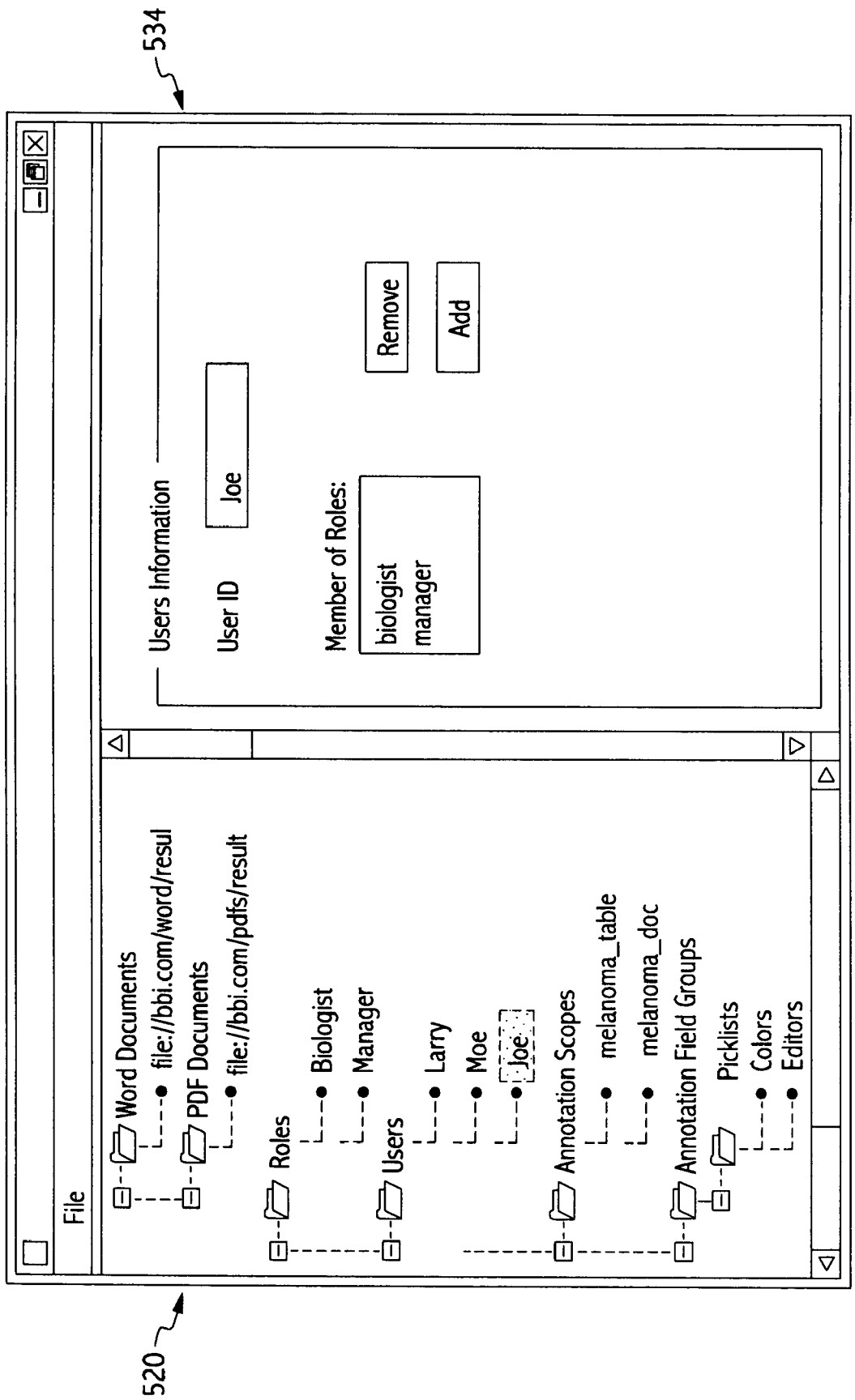

The operations 400 begin at step 402, for example, upon invoking the administrative tools 144 and, at step 404, an interface is provided for defining annotation structures and other related information. The GUI screen of FIG. 5A illustrates one example of the type of interface that may be provided to the user. As illustrated, the GUI screen may include a configuration navigation panel 520 allowing the user to navigate through various configuration data structures (which may be implemented, in XML, as configuration files 148) organized in separate folders (e.g., Data Sources, Roles, Users, etc.). In response to selecting a given folder, the user may be presented with a GUI panel (shown opposite the navigation panel 520) corresponding to the selected folder.

A user may perform a loop of operations 406-412, for example, using the various GUI panels, to define annotation structures that may contain annotation fields selected to capture annotation information associated with a particular combination of data scope and defined user role.

At step 406, various roles (e.g., biologist, chemist, manager, etc.) are defined. For example, in response to selecting the Roles folder in the navigation panel 520, the user may be presented with a GUI panel 530 shown in FIG. 5A allowing a user to add new roles. The user may associate users with roles via a GUI panel 532 shown in FIG. 5B, which may be accessed by selecting a particular role in the navigation panel 520. As an alternative, roles may be associated with users via a similar GUI panel 534 of FIG. 5C accessed by selecting a particular user in the navigation panel 520. As illustrated, multiple roles may be associated with a single user.

At step 408, point types (e.g., annotatable data objects and sub-objects of data sources) are defined. As previously described with reference to FIG. 4B, for some embodiments, the user may be able to select which subtypes of a specified data source, as well as which points within the subtypes, will be annotatable. As illustrated in FIG. 5A, annotatable data sources (e.g., relational database), subtypes (Table X), and points (cells, columns, and rows) may be listed in a hierarchical format in the navigation panel 520.

At step 410, annotation structures are defined, for example, by specifying available annotation fields to be included in the annotation structure. As previously described, the fields included in the annotation structure generally represent the metadata to be captured in the annotation. While not necessary, an annotation structure will typically include at least one field for entering comments.

Figure 5D:
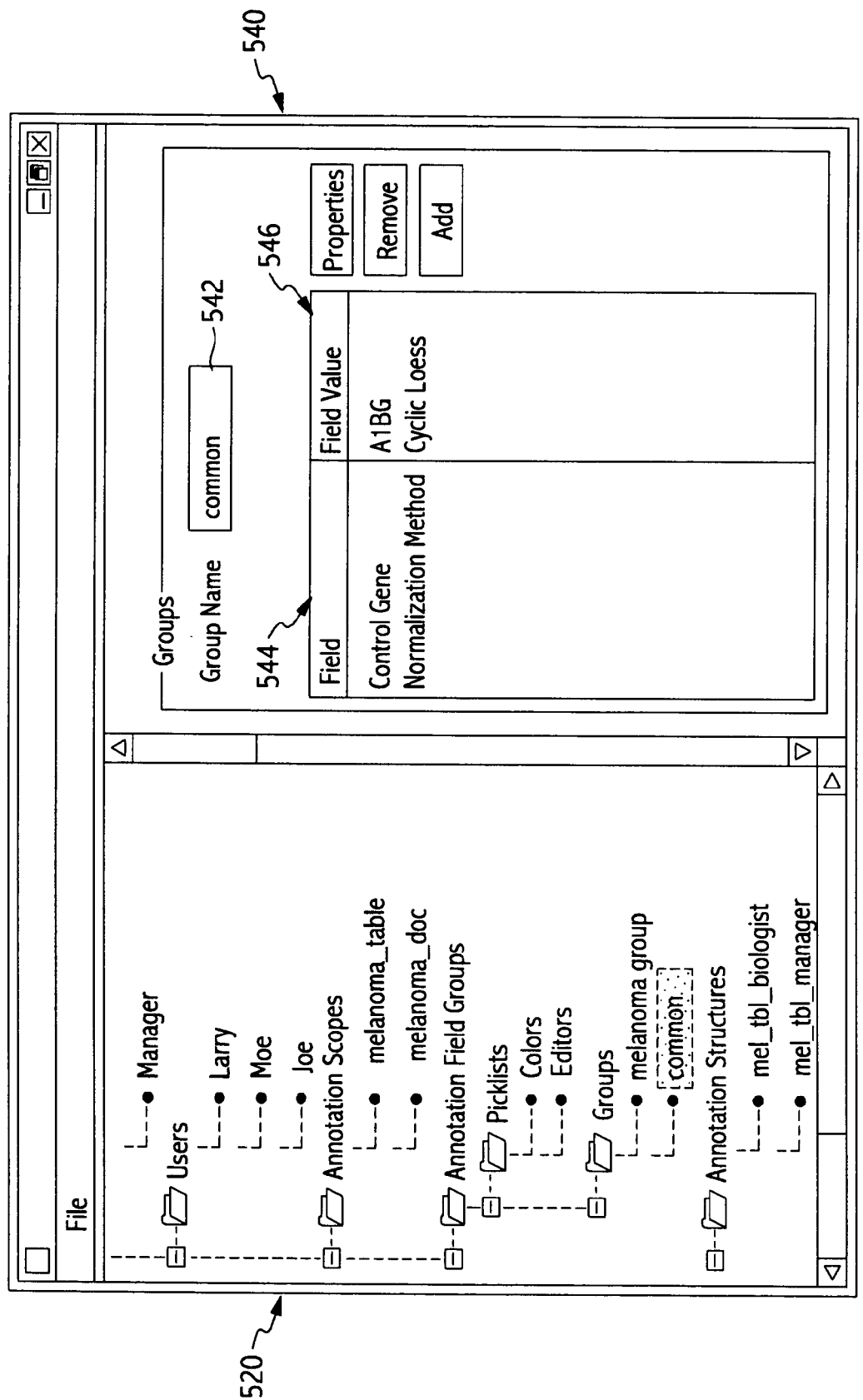
Figure 5E:
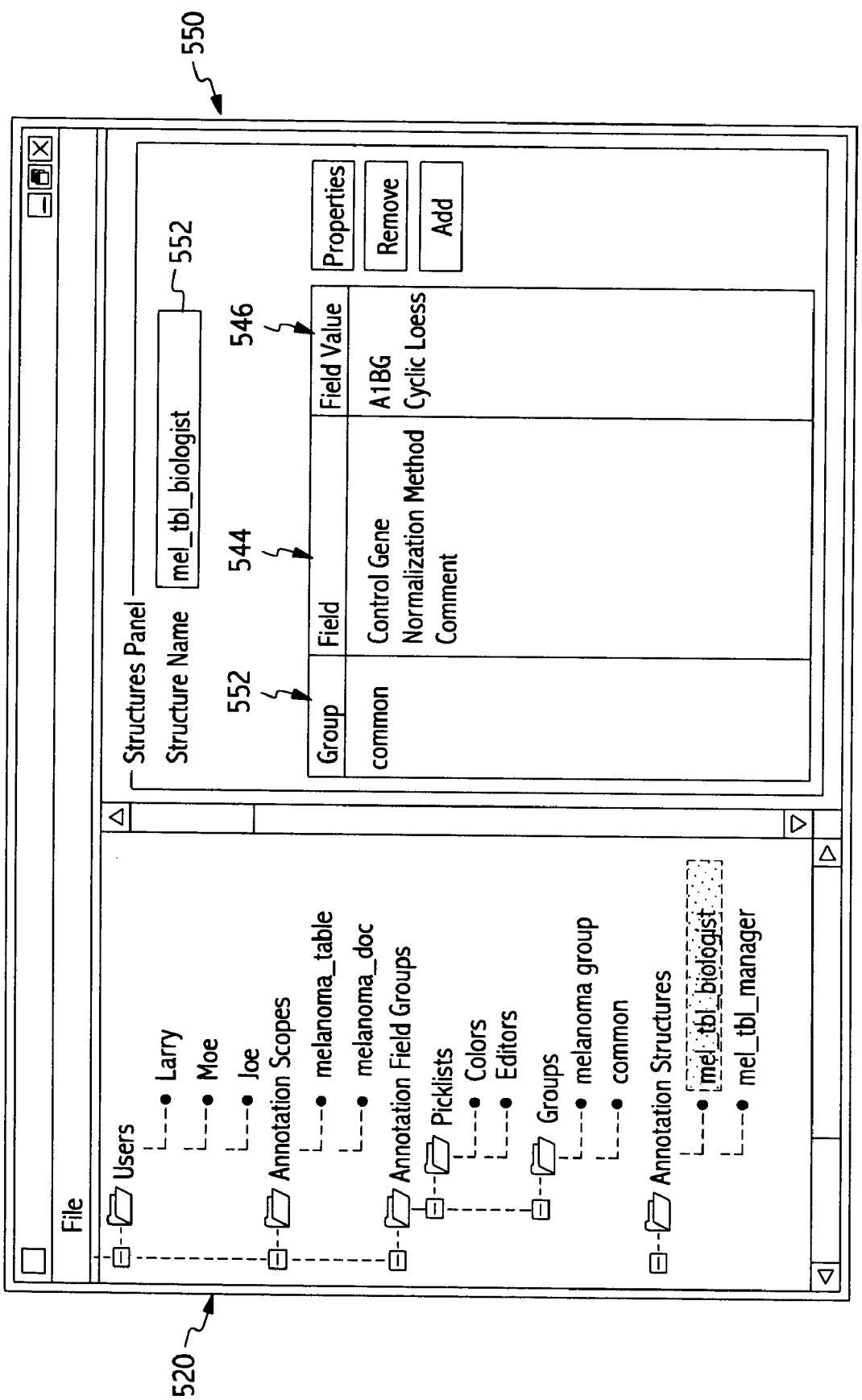

As illustrated in FIG. 5D, for some embodiments, users may be able to create an annotation field group 542 from an associated set of annotation fields 544, via a GUI panel 540. Properties for the fields may also be specified (e.g., the possible data types and values the data entered for the field may have). For example, some fields may be limited to a specific list of values provided as a pick list. Further, default values 546 may also be specified for each field 544 in the group. The creation of annotation field groups may facilitate annotation structure definition by facilitating the reuse of common fields therein. For example, as illustrated in FIG. 5E, annotation structures may be created by adding annotation field groups 552, as well as additional, separate, annotation fields (e.g., not associated with an annotation field group).

Figure 5F:
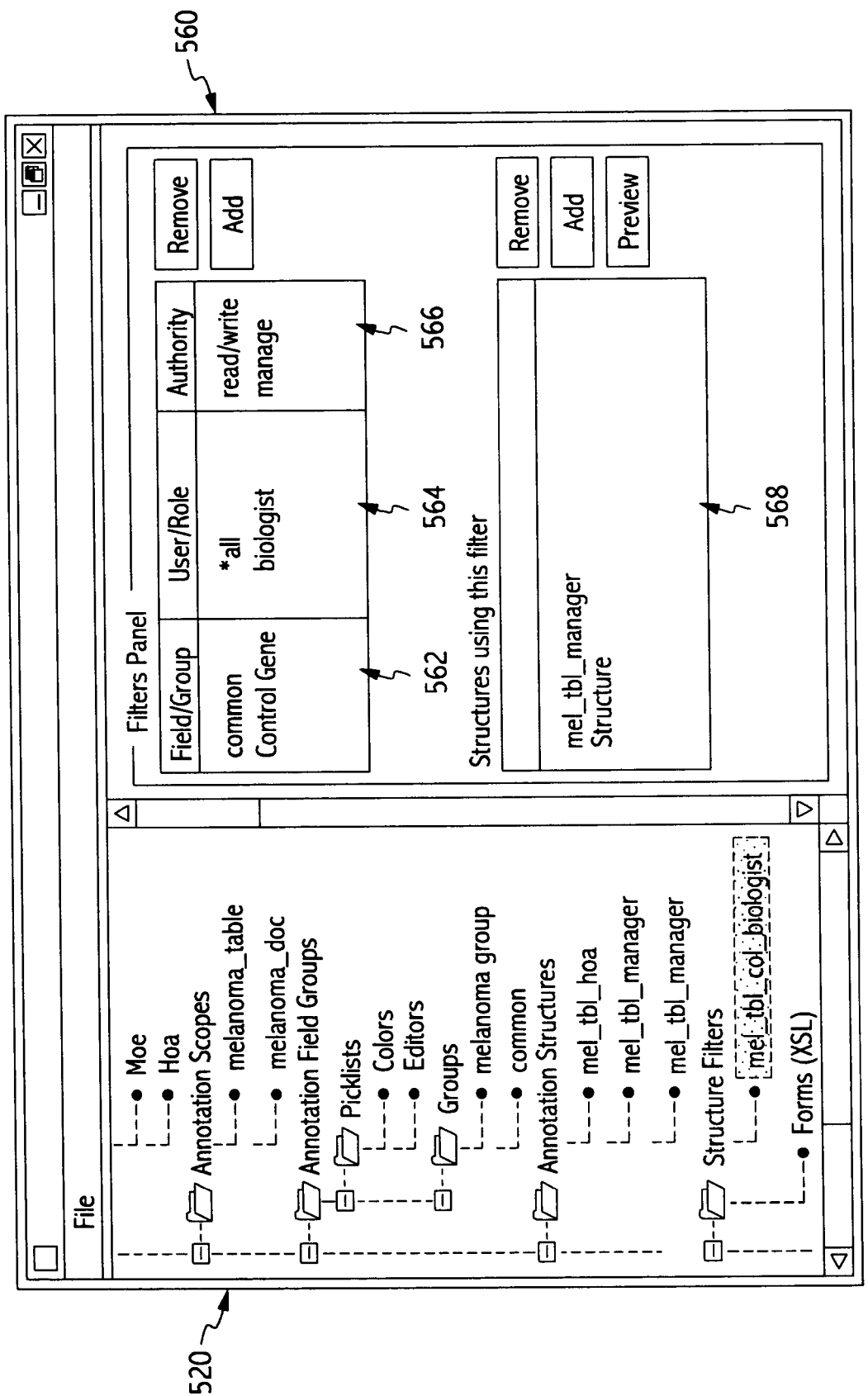

For some embodiments, annotation structures may also include information for further limiting the annotation data that is input by or displayed to a user. For example, as illustrated in FIG. 5F, a filters GUI panel 560 may allow a user to specify an authority, such as read/write authority, read only authority, manage authority (e.g., read/write/create/delete), that one or more users or roles 564 has with respect to a list of corresponding fields or annotation field groups 562. Filters may be used to apply field level access control to restrict access to fields based on user or group. For example, some users may have read-only access to some fields in a structure (e.g., those users can't create or edit annotation data in those fields), while other fields may be hidden from some users (e.g., some annotation fields may be visible only to managers). As illustrated, structures using the specified filter may be listed in a filtered structure window 568.

Figure 5G:
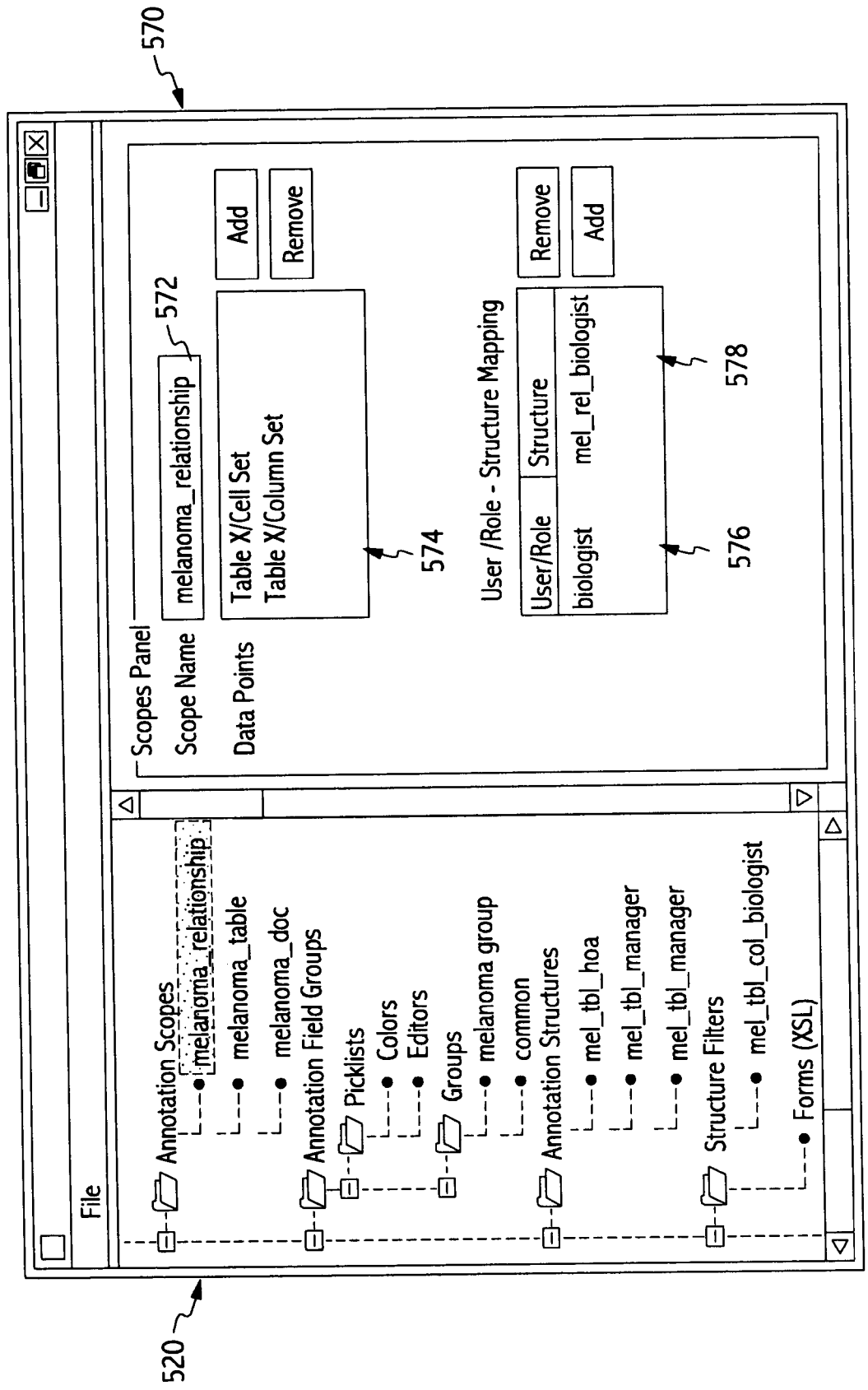

At step 412, structures are associated with annotatable point-role sets. As illustrated in FIG. 5G, a scopes GUI panel 570 may allow users to associated a set of annotatable data points 574 (associated with a scope name 572) and one or more listed roles 576 with one or more listed annotation structures 578. To illustrate the affect of this association, when a user acting in a specified role attempts to create an annotation on a specified data point, the user may be presented with an annotation form allowing a user to enter annotation information corresponding to the annotation fields contained in the associated annotation structure. For example, as illustrated in FIG. 5G, while engaged in the process of conducting melanoma research, a biologist (e.g., a user acting in the role of a biologist) creating an annotation for a cell or column of a database Table X may be presented with a form for entering data for annotation fields included in the annotation structure 578 mel_rel_biologist. If more than one annotation structure were associated with the selected data scope and role of biologist, the user may have been presented with a list of annotation structures that best fit what the user was trying to annotate.

Figure 5H:
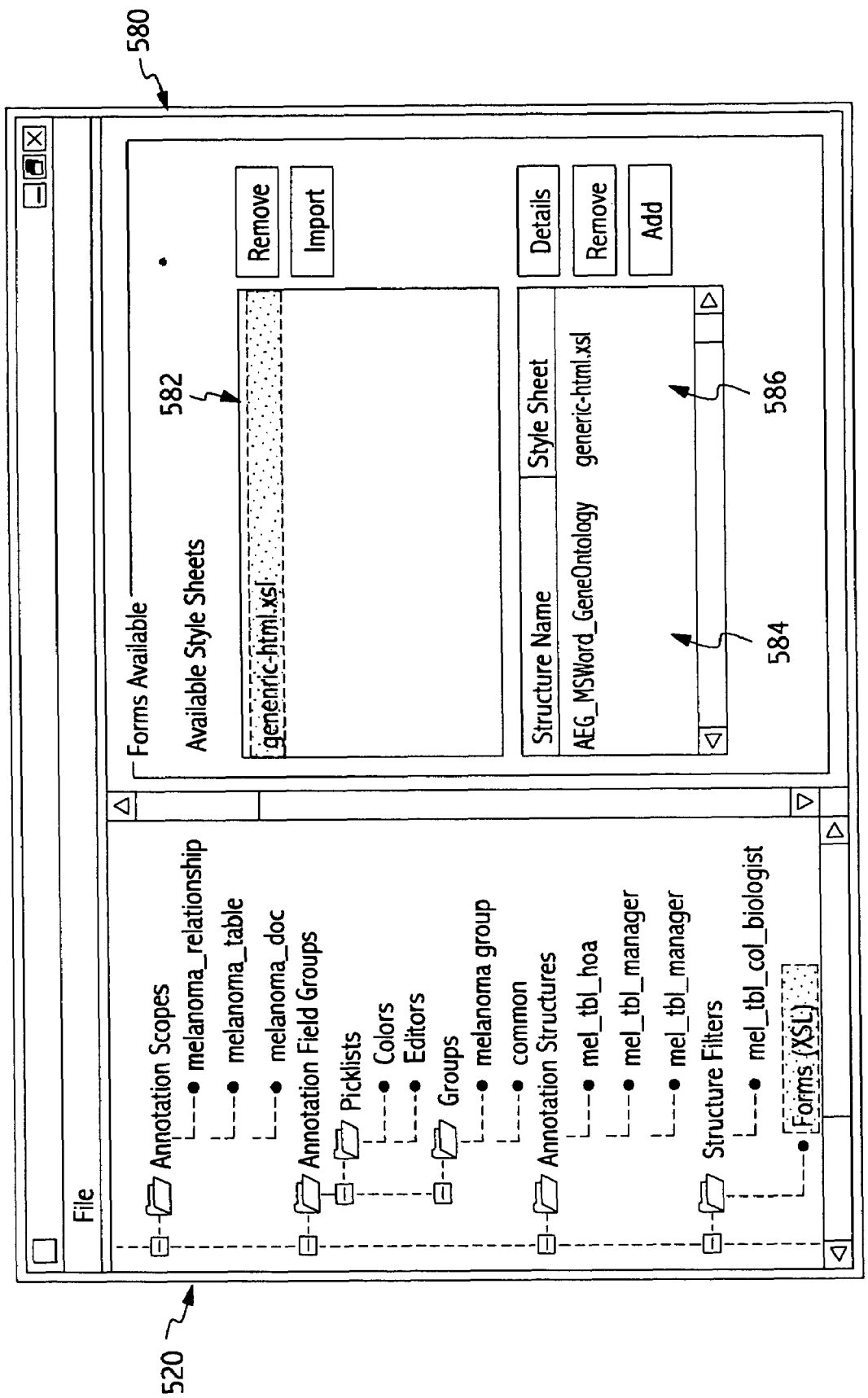

The particular format (e.g., the look and feel) of annotation forms presented to the user may be determined by a selected transform generally defined to create an annotation form (e.g., an annotation GUI) based on a selected annotation structure. In other words, the transform may contain sufficient information to generate an annotation form allowing the user to enter information for the annotation fields contained in the annotation structure, as well as additional information that controls the appearance of the annotation structure, such as color, font, and the like. In some embodiments, such transforms may be implemented as Extensible Stylesheet Language (XSL) files or XSL transforms (XSLT). As illustrated in FIG. 5H, for some embodiments, a forms GUI panel 580 may allow a user to associate one or more stylesheets 586 (from a list of available stylesheets 582) with an annotation structure 584.

If more annotation structures are to be defined, as determined at step 414, the operations 406-412 may be repeated, otherwise, the operations 400 are exited at step 416. It should be noted that more than one annotation structure may be associated with a particular role-point combination. Further, a particular annotation structure may be associated with more than one particular role-point combination. Further, various data structures may be employed to associated annotation structures with annotatable point-role sets. For example, the data source definition file 146 may be populated with entries that indicate (e.g., via a structure ID) a particular annotation structure 149 that should be used when a user operating in a certain role attempts to create an annotation for a specified data object (point).

Creating Annotations

Figure 6A:
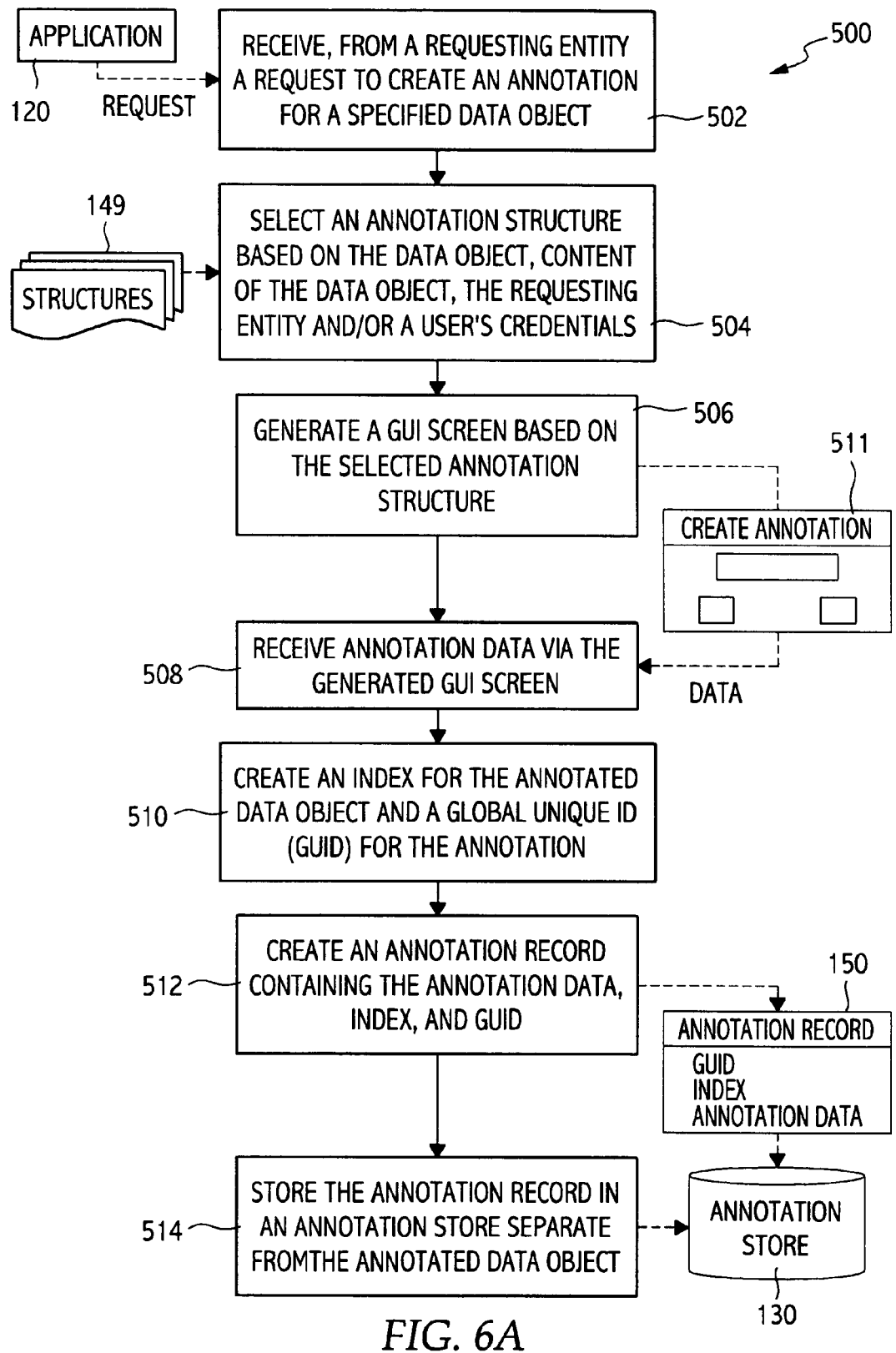
FIGS. 6A and 6B are flow charts illustrating exemplary operations for creating and retrieving annotations, respectively, according to one embodiment of the present invention.

FIG. 6A illustrates exemplary operations 500 for creating annotations. While not shown, it may be assumed that a user's ID and/or role are known. For example, the user may have been required to log into the annotation system and a set of user credentials (e.g., including the user's role, security level, associate user group, or the like) may have been retrieved from a security database 159 containing such user credentials.

During this logon procedure, for example, an API call QueryRoles may be made to determine the available roles the user may act in. If only one role is available, the system may automatically set the user's role accordingly, for example, via a SetRole API call. For some embodiments, if there is more than one role available (e.g., the user may have more than one associated role, such as a manager and a researcher), the user may be presented with a list of the available roles in which the user may act. A SetRole API call may then be made to set the user's role for the session to the role selected by the user. As described below, the role selected by the user may then determine the annotation structures and, hence, the annotation forms presented to the user for creating annotations.

The operations 500 begin at step 502, by receiving, from a requesting entity (e.g., an individual user or application), a request to create an annotation for a specified data object. At step 504, an annotation structure 149 defining fields to be used in creating the annotation is selected based on at least one of a type/scope of the specified data object, content of the data object, the application from which the request is received, and a role (or other credential) of the user. For example, a list of available structures may be obtained via a QueryStructureNames API call which, given the selected data object (e.g., by data source type, subtype and selected points) returns a list of available structures.

Figure 7A:
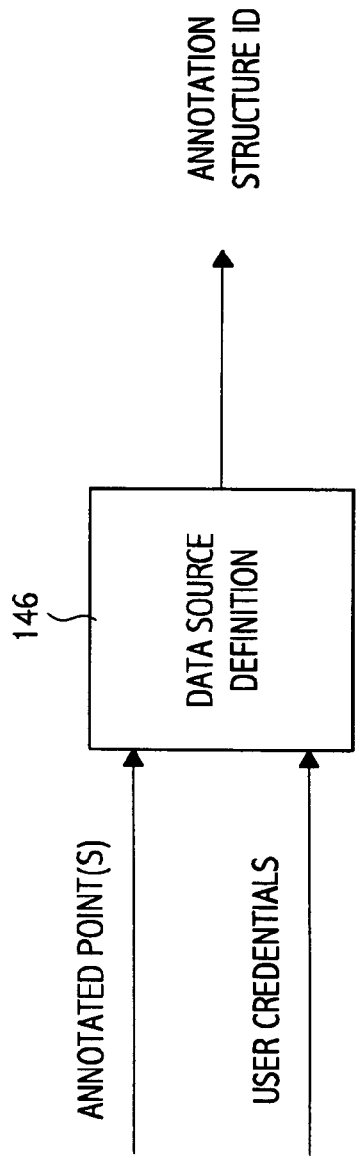
FIGS. 7A-7B illustrate exemplary components for selecting and transforming, respectively, an annotation component according to one embodiment of the present invention.

For some embodiments, as illustrated in FIG. 7A, returning the list of available structures may involve searching the data source definition file 146 for a match on a point to be annotated and/or one or more user credentials (e.g., role, security level, user ID, member group, etc.), and a corresponding annotation structure ID, indicating the structure to be used, may be obtained therefrom. For example, the data source definition file may be implemented as an XML document listing annotation structure ID's for various annotatable point-role pairings.

In addition, or instead of, user credentials and the data object type, annotation structures may be determined by any combination of various other parameters, such as the application from which the request (to create the annotation) is received, or the content of the annotated data object. For example, the content of the annotated data object may be searched for text matching one or more specified text strings in an effort to automatically detect a data entry related to a specified topic. Upon detecting the text string(s) in the data content, an annotation structure specific to that topic may be selected. The format of the data content may also be indicative of the type of data stored therein. As a simple example, social security numbers and phone numbers are each typically stored in a distinctive format (e.g., ###-##-#### and (###)-###-####, respectively).

Further, as an alternative to searching for a text string, the content of an annotatable data object may be searched for a specific value or condition on a value stored in an annotated data object. As an example, a user may associate an annotation structure with a certain value, or range of values, for a given field. As another example, a certain annotation structure may be automatically selected if a data object value exceeds a certain threshold, matches a certain value, or falls within or outside a predetermined range. For some embodiments, an automated process may scan data and automatically generate annotations for values meeting predetermined conditions (e.g., within a defined threshold range of values), for example, in an effort to alert personnel of alarming values (e.g., exceedingly high or low values).

Regardless of how the annotation structure is selected, at step 506, a GUI screen is generated based on the selected annotation structure, for example, allowing a user to input data to the fields of the selected annotation structure. The GUI screen may be generated, for example, by transforming the annotation structure, based on one of a set of XSL transforms obtained via a QueryStructureTransforms API call that returns an array of available transforms associated with a specified annotation structure.

At step 508, annotation data is received via the generated GUI screen. The annotation data may be stored in an annotation record 150. Each annotation record may contain "header" information common to all annotations, such as the annotation author, and a date/time stamp indicating when the annotation was made. As with the annotation content, this header information and the annotation data may be searchable, allowing specific annotations to be retrieved (e.g., by author, date of creation, etc.). The annotation record may be created via a CreateAnnotation API call in which the annotation data is passed.

Each annotation record 150 may also contain links to specialized annotation detail, specific to each type of annotation, a global unique identifier (GUID) uniquely identifying the annotation, as well as an index, which is used to locate the annotated object (and optionally a point within it). Therefore, at step 510, an index for the annotated data object and a GUID for the annotation are created. At step 512, an annotation record 150 is created containing the annotation data, index, and GUID. At step 514, the annotation record is stored in the annotation store 130, separate from the annotated data.

For some embodiments, a change detection value (e.g., a checksum, hash value, or other like parameter) calculated as a function of the annotated data may also be stored with the annotation data. This change detection value may allow changes to the annotated data to be detected. For example, when an annotation is retrieved (or according to some type of schedule), a change detection value may be calculated for the current annotated data and compared against the stored change detection value. Because a change in the annotated data may affect validity of the annotation, a user may be notified if a change in the annotated data is detected. The concepts of using change detection values are described in detail in the commonly owned, co-pending application Ser. No. 10/310,192, entitled "Annotation Validity Using Partial Checksums," filed Dec. 4, 2002, herein incorporated by reference in its entirety.

Retrieving Annotations

Figure 6B:
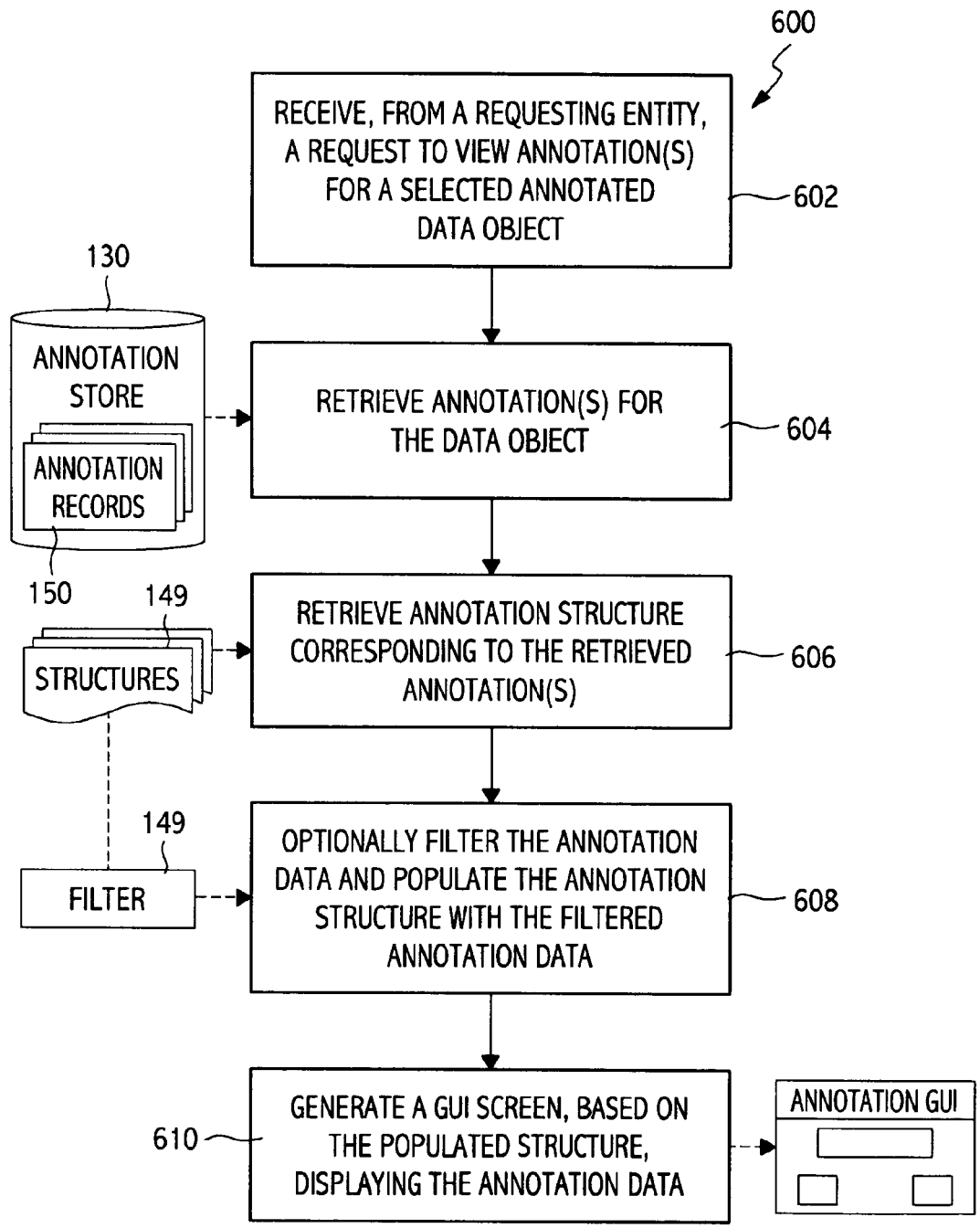

FIG. 6B illustrates exemplary operations 600 for retrieving annotations. The operations 600 begin at step 602, by receiving a request to view annotations for a specified annotated data object. At step 604, an annotation (or annotations) for the specified data object is retrieved. For example, the annotation may be retrieved by converting ID parameters of the data object to an index, and searching the annotation store using the index, as described above, with reference to FIGS. 3B and 3C. For some embodiments, such searching may be accomplished via the QueryAnnotationIDs API call, in which annotation global user IDs (GUIDs) are returned for annotations matching specified search criteria. The corresponding annotations may then be retrieved via the GetAnnotation(s) API call that returns an annotation or annotations given a GUID or array of GUIDs.

At step 606, in preparation of displaying the retrieved annotation, one or more annotation structures 149 corresponding to the specified data object are retrieved. As described above, with reference to creating annotations, the annotation structure may be selected based on the specified data object, as well as other parameters, such as the user's role. For example, only certain users acting in a certain role (or having a certain security level, belonging to a certain user group, etc.) may be authorized to view certain fields containing sensitive data. Therefore, the annotation structure 149 selected may only contain fields the user is authorized to view.

At step 608, the annotation data is optionally filtered, and the fields of the annotation structure are populated with the filtered annotation data. For example, fields that the user (based on the user's role) is not authorized to view will be not be displayed (e.g., filtered out).

Figure 7B:
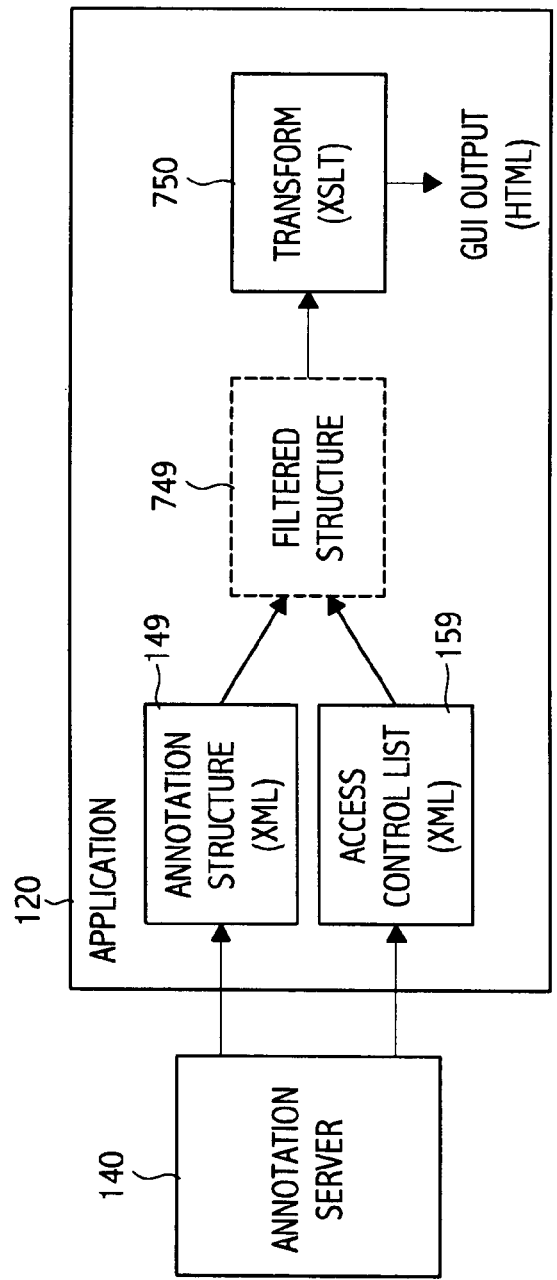

At step 610, a GUI screen is generated based on the populated structure, displaying the annotated data. For example, as illustrated in FIG. 7B, for some embodiments, a filtered annotation structure 749 may be generated (e.g., within an application 120, plug-in component 122 thereof, or the annotation browser 126) based on the selected annotation structure 149 and an access control list (ACL) 159, which typically contains a list of userID's and/or groupID's with a common set of privileges to a protected resource, such as the annotation store 130. For example, the filtered annotation structure 749 may have a limited subset of the fields contained in the selected annotation structure 149. The filtered annotation structure 749 may then be transformed (e.g., using a transform 750) to generate the final GUI displayed to the user. As previously described, the transform 750 may be selected from a list of list of available transforms obtained via the QueryStructureTransforms API.

For some embodiments, annotation structures and ACLs may be implemented as XML documents. The transforms 750 may be implemented as an Extensible Stylesheet Language Transformations (XSLT), commonly used for transforming XML documents into other XML documents. The transform 750 may perform various formatting and other functions on the structure, such as checking for proper data types, allowable values, as well as implementing stylistic features, such as font, color, and the like.

Each application 120 may have one or more associated transforms 750, or may share a common set of one or more transforms. As illustrated, for some embodiments, for example, when viewing annotations from the annotation browser 126, the end result may be in HTML format. Generally, however, the transform 750 may be selected based on the application 120 from which the annotation is to be viewed, in an effort to provide an interface consistent with that application 120. As an example, Microsoft Office applications, such as Word and Excel, may share a common set of transforms 750, providing a common look and feel to annotation GUIs provided therefrom.

Exemplary Application Examples

FIGS. 8-10 are exemplary GUI screens that illustrate some concepts of the present invention applied to create and/or view annotations for different type data objects manipulated by various applications. Of course, details of the exemplary GUI screens shown in FIGS. 8-10 are for illustrative purpose, and a wide variety of other type GUI screens providing similar functionality may also be utilized.

Figure 8A:
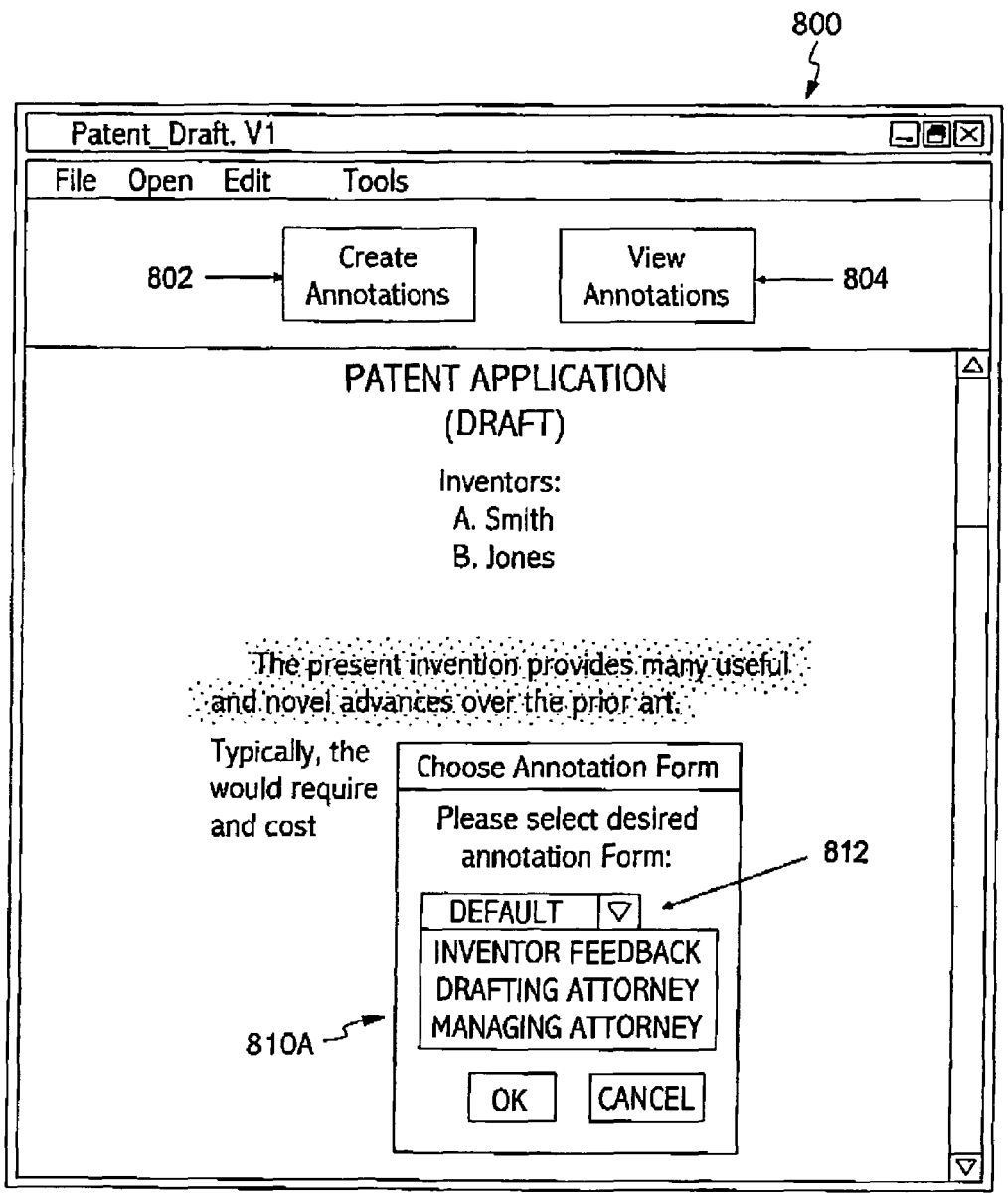
FIGS. 8A-8C are exemplary graphical user interface (GUI) screens for creating an annotation according to one embodiment of the present invention.

FIG. 8A illustrates an exemplary screen 800 of a text editor used to edit a patent application. As shown, the screen 800 may include Create and View Annotations buttons 802 and 804 provided, for example, as part of an annotation plug-in for the text editor, allowing a user to create and view annotations.

In many cases, several different entities may collaborate to generate a patent application, including the inventors, a drafting attorney, and a managing attorney (e.g., the drafting attorney may be a hired "outside counsel" while the managing attorney may be "in-house counsel" for an entity for which the inventors work and to whom the patent application will be assigned). The inventors, drafting attorney, and managing attorney may all have different roles in collaborating on the patent application. For example, while the drafting attorney is charged with actually writing the application, the inventors are typically charged with reviewing the application to ensure that the description is technically correct, adequately describes, and enables their invention. The managing attorney, on the other hand, may also review the application, but with a slightly different focus, for example, to ensure the patent application provides the best (e.g., broadest) possible protection against competitors, often in light of other patents or applications in a patent portfolio. As such, annotations made by the different parties may different in order to capture different information.

Therefore, as described above, different type annotation forms (based on different annotation structures) may be provided to allow the capture of the different information. As previously described, for some cases, an annotation structure may be automatically selected, based on a number of parameters, such as the specified data object to be annotated, the role (or other credential) of a user, content/format of the annotated data, and the like. For example, a set of patent-specific forms may be presented based on a text search for the string "patent" in the title or other portion of the document. If there is more than one annotation structure corresponding to a given set of parameters (e.g., annotated data point and role of a user), the user may be presented with a choice of structures/forms from which to choose. Alternatively, some implementations may not perform automatic role checking and a user may be presented with a choice of all available annotations forms.

In either case, in response to submitting a request to create an annotation, the user may be presented with a list of annotation forms from which to choose in a GUI, such as the GUI $810_A$ shown in FIG. 8A. As shown, the user may be able to select a desired annotation form from a pull down menu 812. Illustratively, four annotation forms are offered, a default form, an inventor feedback form, drafting attorney form, and managing attorney form (alternatively, any of these forms may be automatically selected, for example, based on the user's role).

Figure 8B:
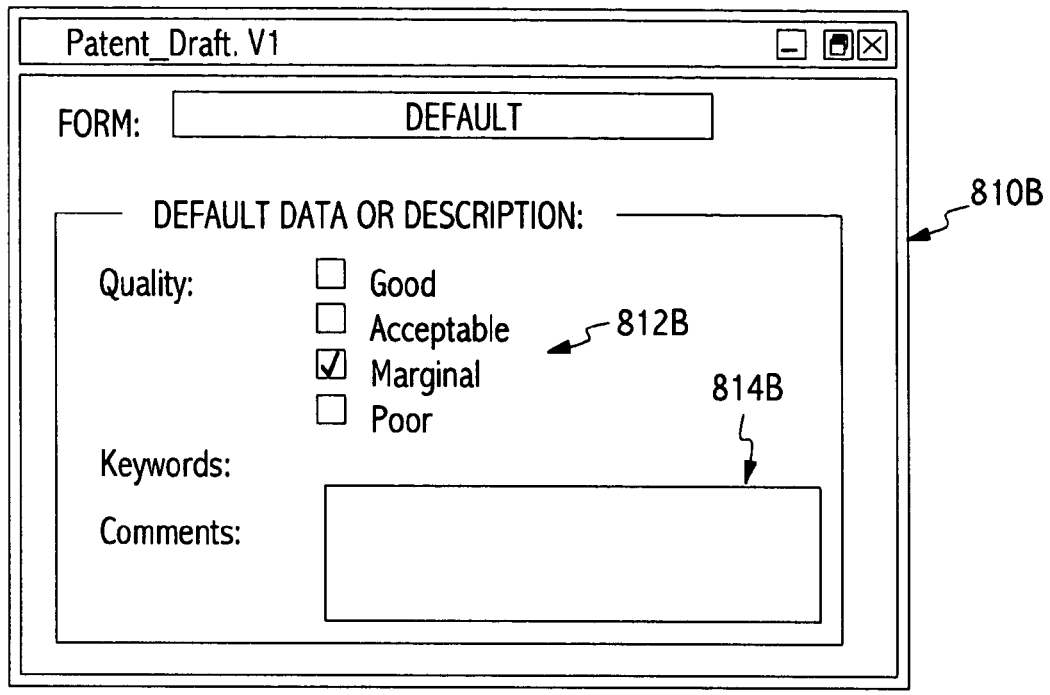

FIG. 8B illustrates an exemplary default annotation form $810_B$ that may be presented to the user, for example, in response to selecting the default form from the pull down menu 812. The default annotation form $810_B$ may be generated, for example, by transforming a default annotation structure specifying a set of default annotation fields. As illustrated, the default annotation form $810_B$ may contain generic quality check boxes $812_B$ and a generic comment text box $814_B$.

Figure 8C:
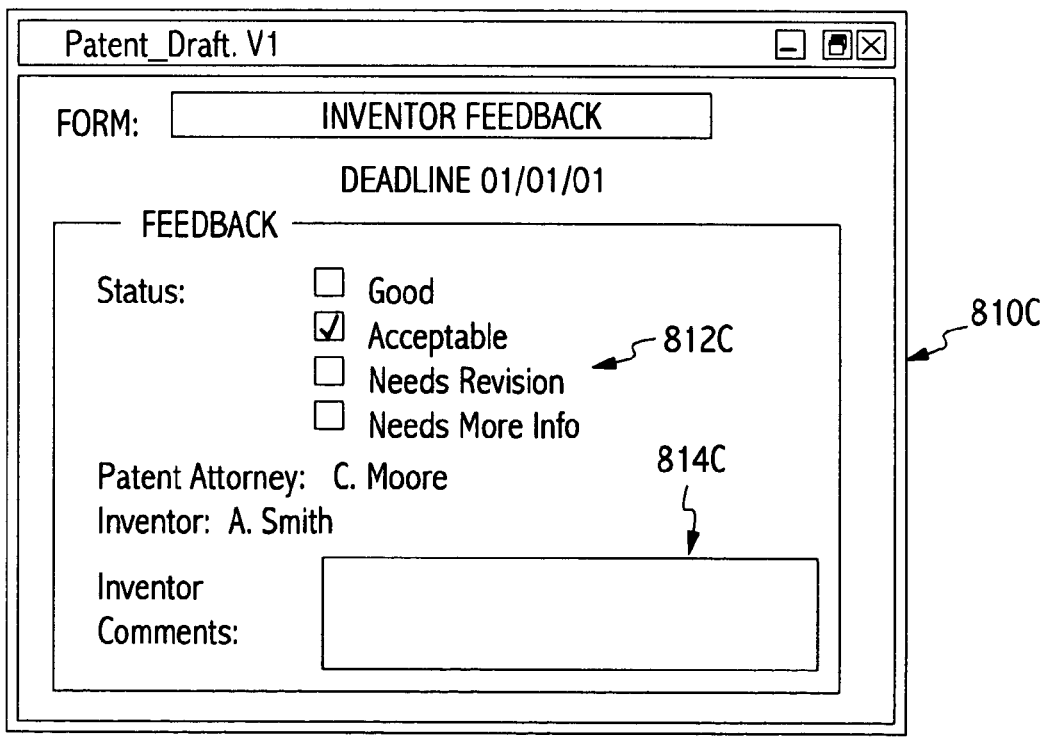

FIG. 8C illustrates an exemplary inventor feedback annotation form $810_C$ that may be selected by the user, for example, via the pull down menu 812, or automatically based on the user's role. As illustrated, the inventor feedback annotation form $810_C$ may have more specific check boxes $812_C$ relating to the patent application process, an inventor comment text box $814_C$, and may list the patent attorney and inventor by name. Optional other fields (not shown) may include a docket number, invention title, and other fields that may be useful to search.

Figure 9A:
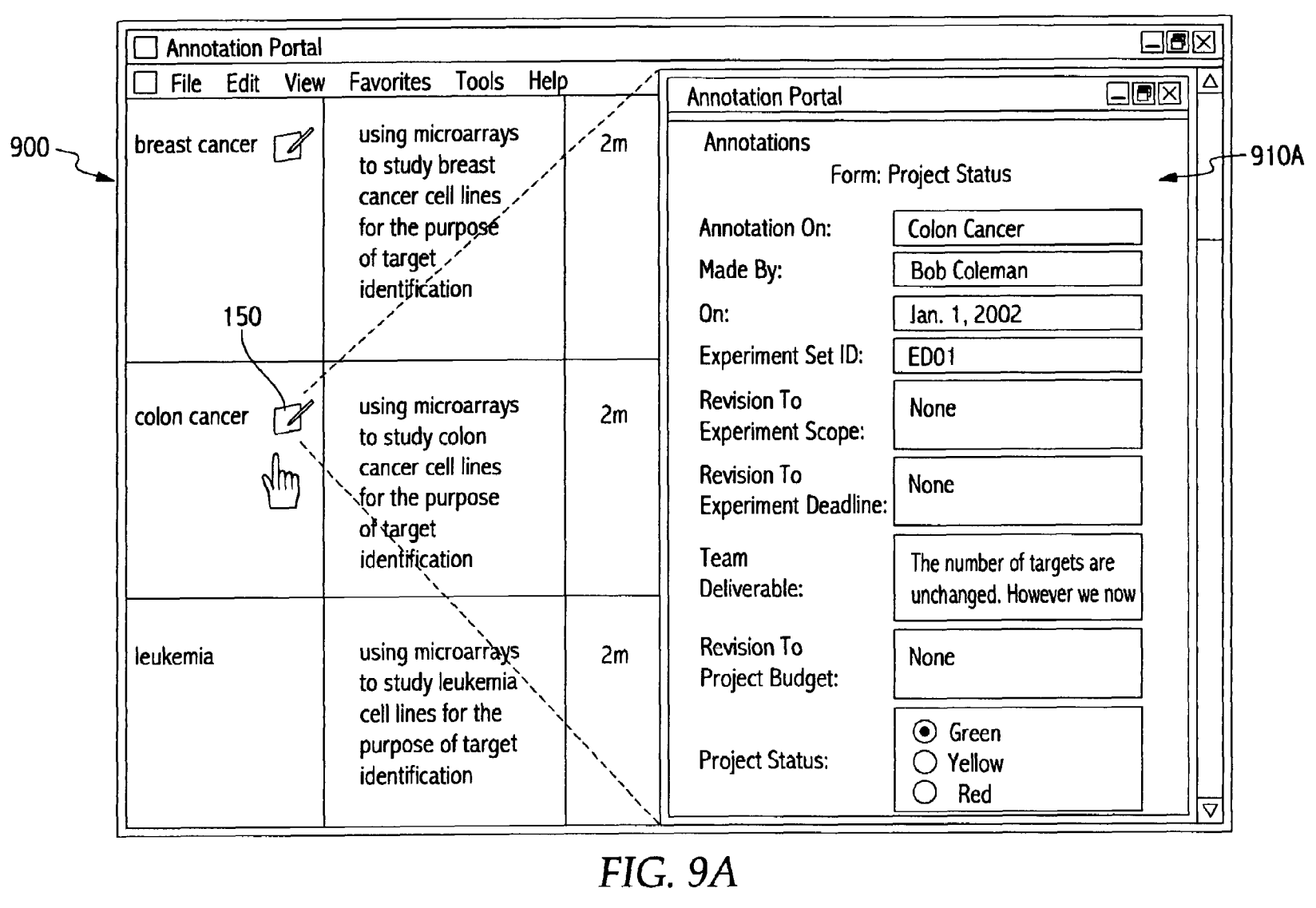
Figure 9B:
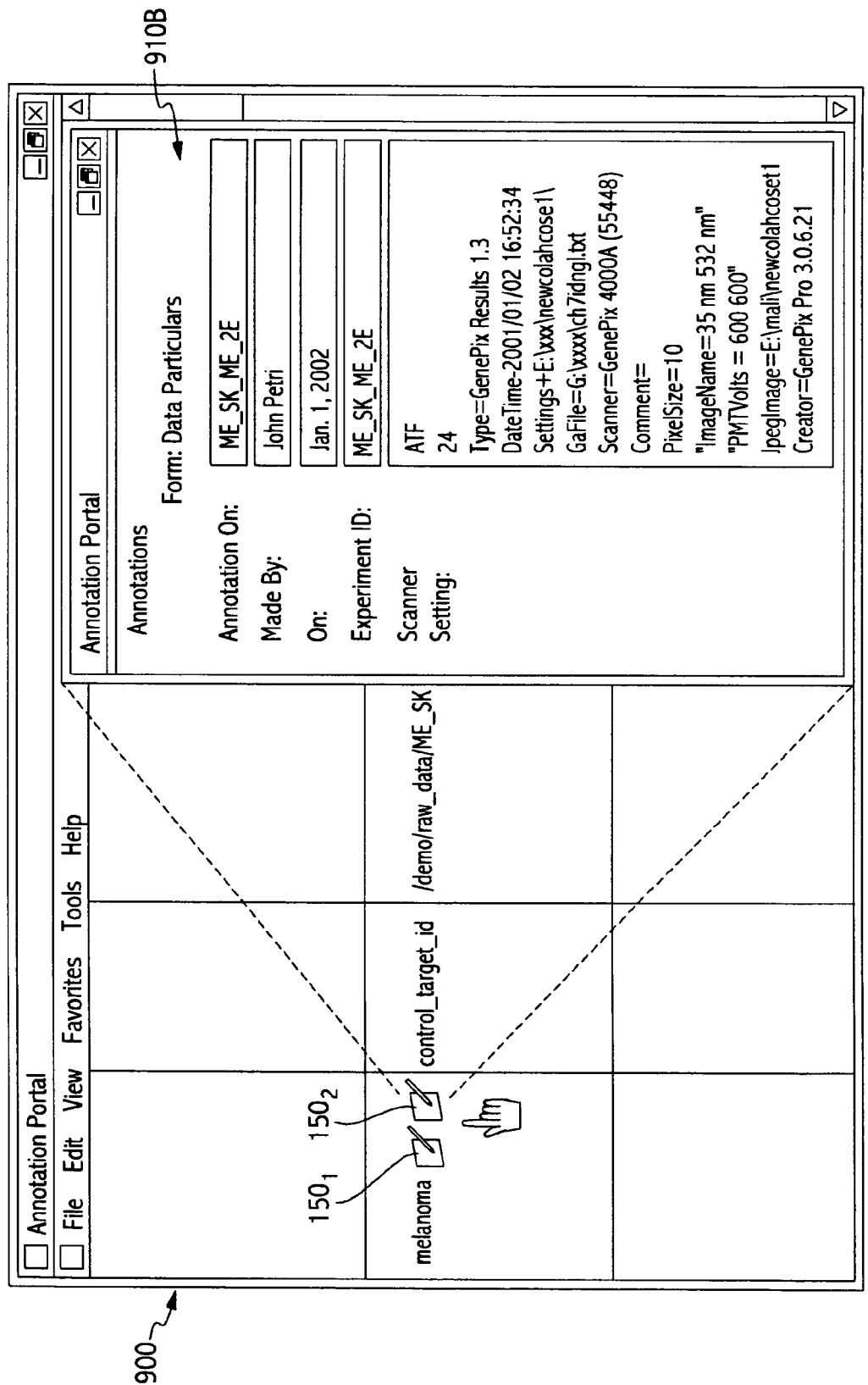

FIG. 9A illustrates an exemplary screen 900 of a browser application, displaying medical research data (e.g., possibly the results of a query). As illustrated, an annotation icon 150 may be displayed to indicate annotated data items (in this example, specifying a type of a research project, colon cancer). For example, as previously described, the annotation store 130 (e.g., index tables 134) may be searched to determine if any annotations exist for data objects returned as query results. As illustrated in FIG. 9B, multiple annotation icons $150_1$ and $150_2$ may be displayed next to data objects having multiple annotations. Alternatively, a single icon representing multiple annotations may be displayed.

Returning back to FIG. 9A, in response to selecting (e.g., clicking on) the annotation icon 150 for the colon cancer research project, a GUI $910_A$ may be displayed with the corresponding annotation. The GUI $910_A$ illustrates a fairly comprehensive annotation form specific to annotating a project's status. As illustrated in FIG. 9B, however, for the same type of data object (e.g., project description) another type of annotation, for example, specific to the particular details of how data is collected may be displayed in a GUI $910_B$. For example, the GUI $910_B$ may contain fields specifying specific equipment used to gather data (e.g., a laser scanner) and particular settings for the equipment.

Searching Data And Annotations

For some applications, it may be desirable to be able to search data, as well as annotations created for that data from a single application, such as the annotation browser 126. As an example, a medical researcher may be interested in reviewing annotations authored by his manager, and/or annotations created within a certain time range (e.g., within the last month), as well as reviewing the annotated data. For example, the manager may have generated annotations that question the validity of certain data and the researcher may be charged with verifying and/or correcting the data in question.

Figure 10A:
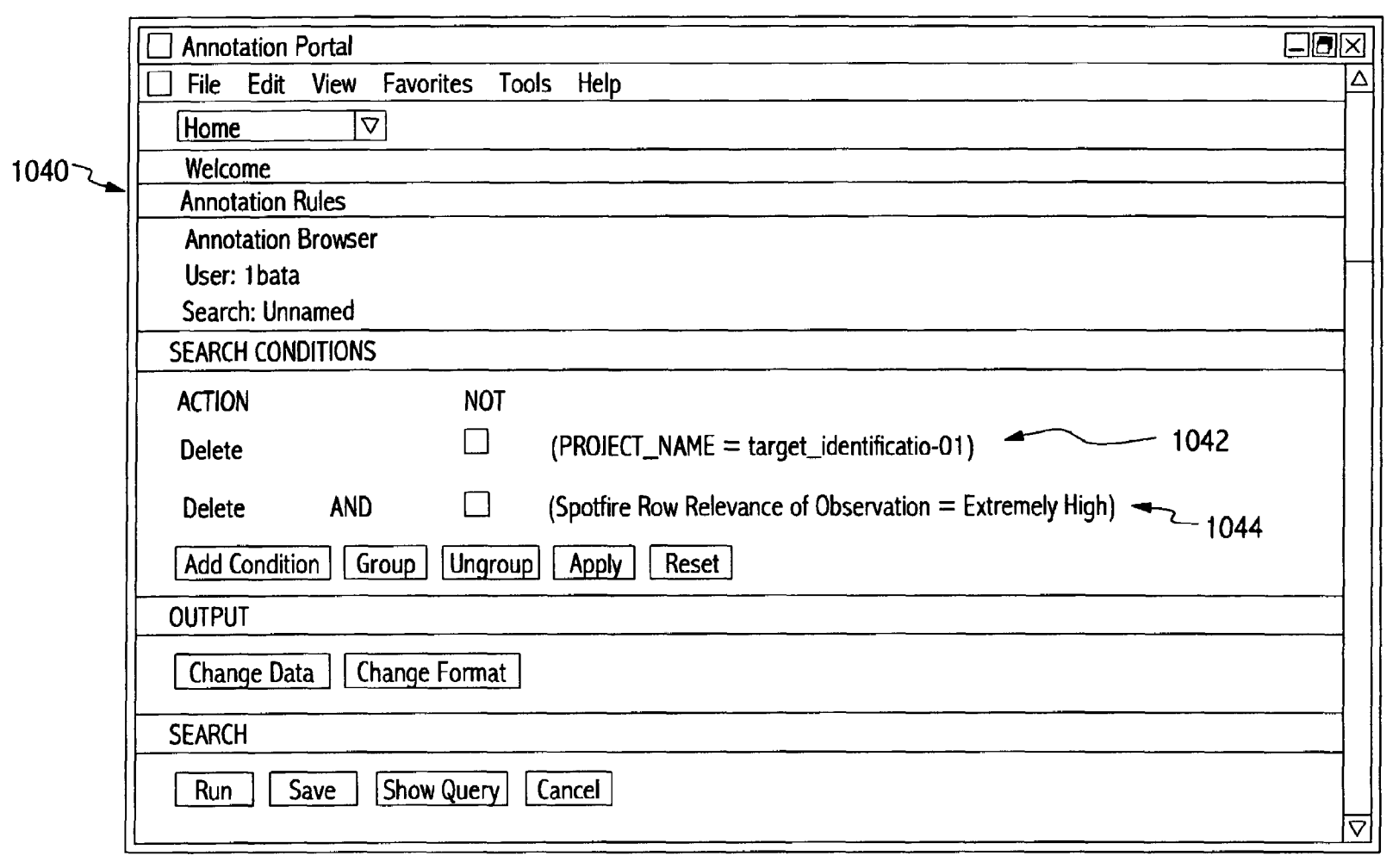
Figure 10B:
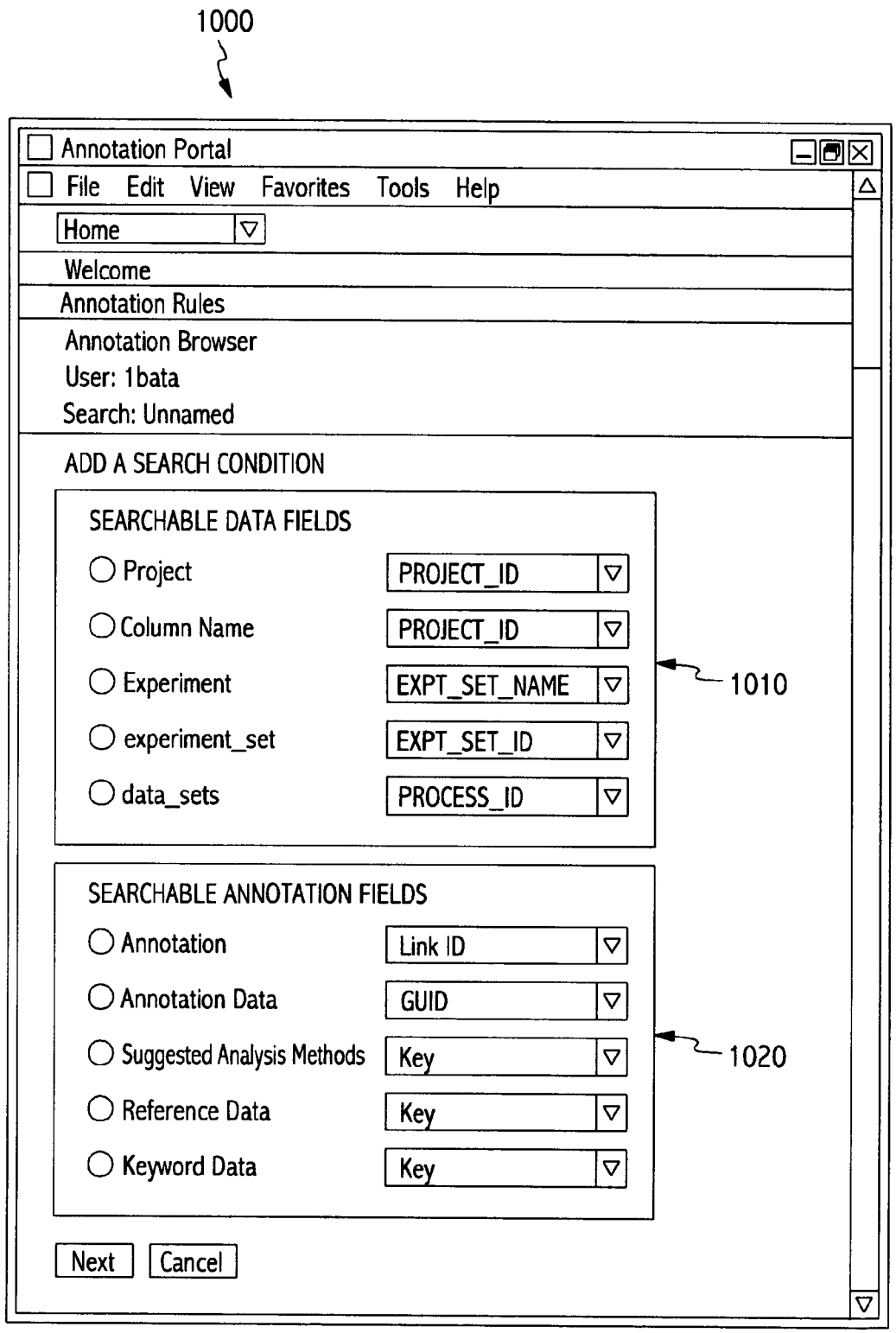
Figure 10C:
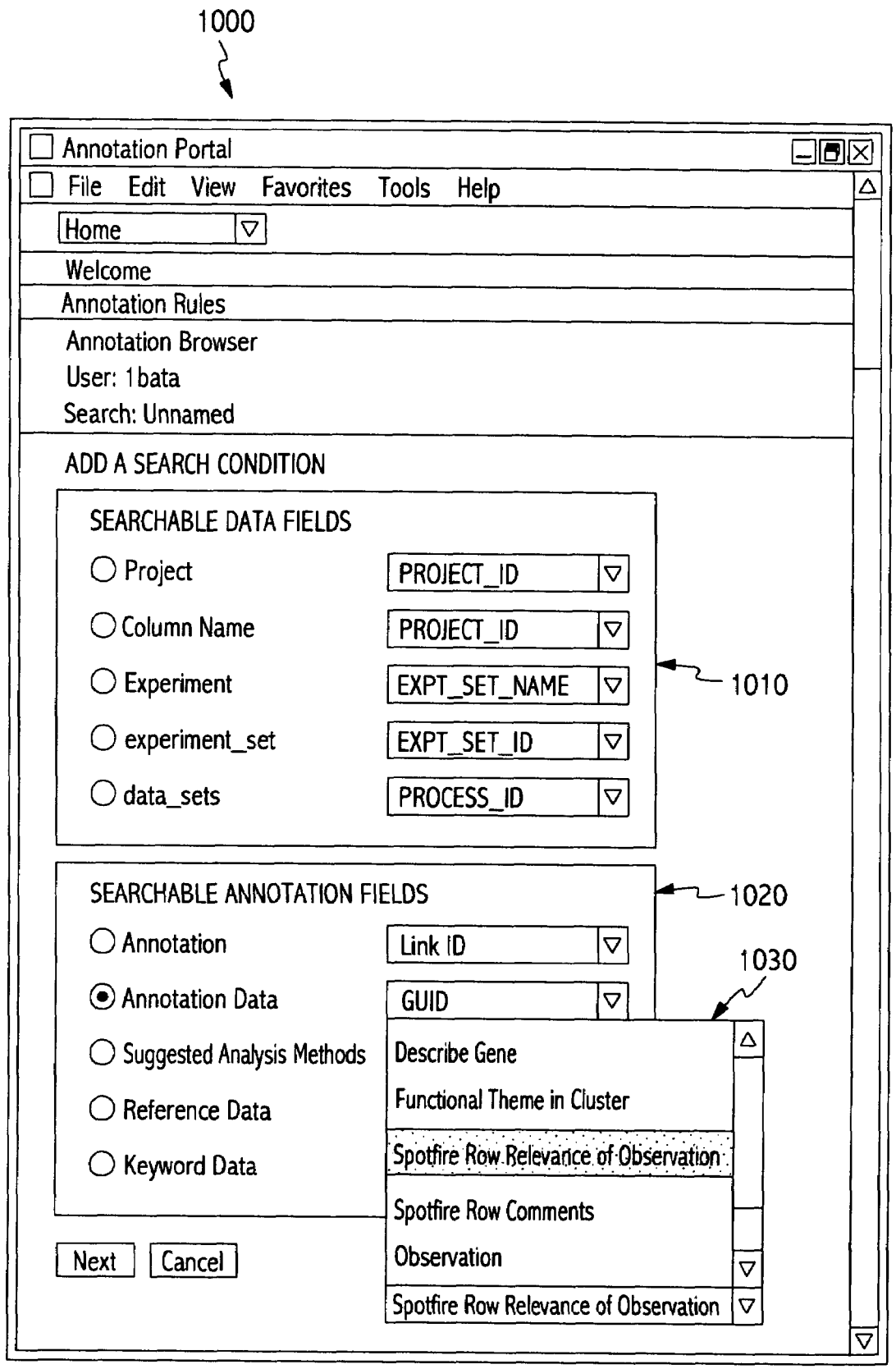

As previously described, for some embodiments, the annotation browser 126 may provide a generalized web-based user interface for viewing structured data content (e.g. application source data that can be accessed directly through queries via the query interface 119), and for creating and viewing annotations on it. In other words, the annotation browser 126 may provide unified searchable access to both data and annotations on the data. FIGS. 10A-10C illustrate exemplary GUI screens 1000 and 1040 that may be presented by the annotation browser 126 for building a query that may target data, annotations made for the data, or both.

For example, a user may be presented with a main query building GUI screen 1040 of FIG. 10A allowing the user to build a query against data and/or annotations by adding search conditions (i.e., query predicates) based on searchable fields of the data or annotations. An exemplary query is shown having a first search condition 1042 targeting data (a search condition based on a project name) and a second condition 1044 targeting annotations. As shown, a user may be able to add search conditions, via an Add Condition button.

In response to selecting the Add Condition button, a user may be presented with the GUI screen 1000 of FIG. 10B, presenting the user with a set of searchable field categories 1010 related to the data and a set of searchable field categories 1020 related to annotations on the data. In response to selecting a category, the user may be presented with a set of fields associated with the selected category. For example, as illustrated in FIG. 10C, in response to selecting the Annotation-Data category, the user may be presented with a picklist 1030 of searchable annotation fields associated with the annotation data.

After selecting a field from the picklist 1030, the user may then be presented with another GUI (not shown) for specifying a search condition (i.e., query predicate) based on the selected field. The GUI presented for specifying the search condition may depend on the selected field and the data type of the selected field. For example, if a text field is selected, the user may be presented with a GUI for specifying a condition, for example, based on a text string. On the other hand, if a data field is selected, the user may be presented with a GUI for specifying a value, or range of values.

In any case, after specifying the search condition, the user may return to the main query building GUI screen 1040 of FIG. 10A. The user may then add more search conditions, or run the query. Running the illustrated query may return different types of information, depending on the implementation. For example, running the query may return a list of annotations (satisfying the annotation condition 1044) for data satisfying the data condition 1042, data (satisfying the data condition 1042) annotated by annotations satisfying the annotation condition 1044, or both.

If the data is in tabular form, running the query may return the data satisfying the data condition 1042, in a format similar to that shown in FIGS. 9A-9B, with annotation icons, allowing the user to selectively view the corresponding annotations. Alternatively, the annotations satisfying the annotation condition 1044 (describing data satisfying the data conditions 1042 may be listed with a link to the annotated data (if an annotation describes data contained in more than one data source, a link to each data source may be provided). A user may optionally view the annotated data by selecting the link which may, for example, automatically invoke an application 120 associated with the annotated data source, along with an indication of the annotated data (e.g., highlighted text, an annotation icon, or some other type of indication).

While the annotation browser 126 may provide unified searchable access to both data and annotations on the data, as described above, for some embodiments, similar functionality may be provided via the annotation API 142 (shown in FIGS. 2 and 3), or other such interface. For example, a requesting entity (e.g., an application 120) may pass annotation and/or data search conditions to the annotation server 140 via an annotation API 142 function. The annotation server 140 may then construct queries against the data and annotations, as necessary, and return annotations and/or data satisfying the search conditions.

Conclusion

A universal annotation system allows annotations created for a variety of different type data objects manipulated by a variety of different type applications to be created, organized, and searched. The variety of applications may communicate with an annotation server to access annotations from an annotation store. The annotation store may be separate from the annotated data, allowing annotations on the data, without modifying the annotated data. Plug-in components may provide access to the annotation server from within existing applications used to manipulate the annotation data. Accordingly, annotation functionality may be added to new applications via the addition of new plug-in components, without having to redesign the annotation server, thus saving development time and associated cost. A common interface, such as an annotation browser, may provide a central source for individually or simultaneously searching both annotations and the annotated data.

While the foregoing is directed to embodiments of the present invention, other and further embodiments of the invention may be devised without departing from the basic scope thereof, and the scope thereof is determined by the claims that follow.

What is claimed is:

1. A method for exchanging information between entities on a network comprising:
    installing an annotation management system on the network;
    identifying a plurality of annotatable heterogeneous data objects, each manipulated by a corresponding one of a plurality of applications on the network, wherein each of the plurality of applications specifies an indexing mechanism for indexing data objects associated with a respective application, and wherein the indexing mechanism for each of the plurality of applications is different from one another; and
    providing a set of one or more configuration tools configured to:
        allow a user to define an annotation structure containing one or more annotation fields for annotations created for a respective application, and wherein one or more of the annotation fields are used to store metadata included in a given annotation and wherein one or more of the annotation fields store metadata used to index an annotation according to the indexing mechanism and mapping function associated with the respective application;
        associate the annotation structure with at least one of the plurality of applications;
        allow a user to define roles configured to determine the type of information captured or viewed in an annotation created for a given data object of a given application; and associate annotation structures defined by the user with combinations of the user defined roles and annotatable data objects, whereby a subsequent request to annotate a given annotatable data objects results in a selection of one or more of the associated annotation structures based on a match between a role of a user making the subsequent request and the role associated with the one or more of the associated annotation structures.

2. The method of claim 1, wherein the configuration tools provide one or more graphical user interface screens for associating one or more roles with a user.

3. The method of claim 1, wherein the configuration tools provide one or more graphical user interface screens for associating one or more users with a role.

4. The method of claim 1, wherein the configuration tools allow a user to specify one or more filters specifying how annotation fields contained in an annotation structure can be manipulated based on user roles.

5. The method of claim 1, wherein the configuration tools:
allow a user to specify one or more annotation field groups; and
allow annotation field groups to be added to annotation structures.

6. The method of claim 1, wherein the configuration tools allow a user to associate one or more transforms with an annotation structure, the transforms for use in converting the annotation structure into a graphical user interface.

7. The method of claim 1, wherein the configuration tools allow a user to associate an annotation structure with annotatable data objects associated with more than one heterogeneous data source.

8. The method of claim 1, wherein the configuration tools allows annotatable sub-objects of data objects to be associated with annotation structures.

* * * * *

UNITED STATES PATENT AND TRADEMARK OFFICE
CERTIFICATE OF CORRECTION

PATENT NO. : 7,620,648 B2  Page 1 of 1
APPLICATION NO. : 10/600317
DATED : November 17, 2009
INVENTOR(S) : Cragun et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1319 days.

Signed and Sealed this

Twenty-sixth Day of October, 2010

David J. Kappos
*Director of the United States Patent and Trademark Office*